United States Patent
Shah et al.

(10) Patent No.: US 11,983,140 B2
(45) Date of Patent: *May 14, 2024

(54) EFFICIENT DECONFIGURATION OF A RECONFIGURABLE DATA PROCESSOR

(71) Applicant: SambaNova Systems, Inc., Palo Alto, CA (US)

(72) Inventors: Manish K. Shah, Austin, TX (US); Ram Sivaramakrishnan, San Jose, CA (US); Mark Luttrell, Cedar Park, TX (US); David B. Jackson, Dana Point, CA (US); Raghu Prabhakar, Sunnyvale, CA (US); Sumti Jairath, Santa Clara, CA (US); Gregory Frederick Grohoski, Bee Cave, CA (US); Pramod Nataraja, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 17/533,058

(22) Filed: Nov. 22, 2021

(65) Prior Publication Data
US 2022/0083499 A1    Mar. 17, 2022

Related U.S. Application Data

(63) Continuation of application No. 16/198,086, filed on Nov. 21, 2018, now Pat. No. 11,188,497.

(51) Int. Cl.
*G06F 1/24*    (2006.01)
*G06F 9/445*    (2018.01)
(Continued)

(52) U.S. Cl.
CPC ...... *G06F 15/7871* (2013.01); *G06F 9/44505* (2013.01); *G06F 13/364* (2013.01); *G06F 8/65* (2013.01); *G06F 9/4411* (2013.01)

(58) Field of Classification Search
CPC ............. G06F 15/7871; G06F 9/44505; G06F 13/364; G06F 15/7867; Y02D 10/00
(Continued)

(56) References Cited

U.S. PATENT DOCUMENTS

| 4,769,790 A | 9/1988 | Yamashita |
| 5,498,975 A | 3/1996 | Cliff et al. |

(Continued)

FOREIGN PATENT DOCUMENTS

| CN | 1122026 A | 5/1996 |
| CN | 1122026 C | 9/2003 |

(Continued)

OTHER PUBLICATIONS

U.S. Appl. No. 16/239,252—Response to Office Action dated Aug. 7, 2019, filed Sep. 26, 2019, 6 pages.

(Continued)

*Primary Examiner* — Volvick Derose
(74) *Attorney, Agent, or Firm* — Flagship Patents; Sikander M. Khan; Bruce A. Young

(57) ABSTRACT

A reconfigurable data processor comprises a bus system, and an array of configurable units connected to the bus system, configurable units in the array including configuration data stores to store unit files comprising a plurality of sub-files of configuration data particular to the corresponding configurable units. A configuration unload controller connected to the bus system, including logic to execute an array configuration unload process, including distributing a command to a plurality of the configurable units in the array to unload the unit files particular to the corresponding configurable units, (Continued)

the unit files each comprising a plurality of ordered sub-files, receiving sub-files via the bus system from the array of configurable units, and assembling an unload configuration file by arranging the received sub-files in memory according to the configurable unit of the unit file of which the sub-file is a part, and the order of the sub-file in the unit file.

27 Claims, 14 Drawing Sheets

(51) Int. Cl.
G06F 13/364 (2006.01)
G06F 15/78 (2006.01)
G06F 8/65 (2018.01)
G06F 9/4401 (2018.01)

(58) Field of Classification Search
USPC ........................................................ 713/100
See application file for complete search history.

(56) References Cited

U.S. PATENT DOCUMENTS

| | | | |
|---|---|---|---|
| 5,560,029 A | 9/1996 | Papadopoulos et al. |
| 5,794,033 A | 8/1998 | Aldebert et al. |
| 5,963,746 A | 10/1999 | Barker et al. |
| 6,105,119 A | 8/2000 | Kerr et al. |
| 6,119,181 A | 9/2000 | Vorbach et al. |
| 6,728,862 B1 | 4/2004 | Wilson |
| 6,728,871 B1 | 4/2004 | Vorbach et al. |
| 7,111,213 B1 | 9/2006 | Dastidar et al. |
| 7,228,521 B1 | 6/2007 | Ma et al. |
| 7,251,804 B1 | 7/2007 | Trimberger |
| 7,299,339 B2 | 11/2007 | Ramesh |
| 7,685,254 B2 | 3/2010 | Pandya |
| 7,797,258 B1 | 9/2010 | Bowman et al. |
| 7,864,620 B1* | 1/2011 | Pedersen ............. G11C 7/1006 |
| | | 365/189.16 |
| 7,904,848 B2 | 3/2011 | Coene et al. |
| 7,906,984 B1 | 3/2011 | Montminy et al. |
| 7,952,387 B1 | 5/2011 | Frazer |
| 7,996,684 B2 | 8/2011 | Wasson et al. |
| 8,006,021 B1 | 8/2011 | Li et al. |
| 8,045,546 B1 | 10/2011 | Bao et al. |
| 8,261,042 B2 | 9/2012 | Kanstein et al. |
| 8,645,955 B2 | 2/2014 | Yim et al. |
| 8,656,141 B1 | 2/2014 | Agarwal |
| 8,990,740 B2 | 3/2015 | Zhang et al. |
| 9,129,043 B2 | 9/2015 | Pandya |
| 9,158,575 B2 | 10/2015 | Smith |
| 9,201,899 B2 | 12/2015 | Nishimura et al. |
| 9,372,956 B1 | 6/2016 | Fan et al. |
| 9,411,532 B2 | 8/2016 | Vorbach et al. |
| 9,448,967 B2 | 9/2016 | Kuechler |
| 9,465,632 B2 | 10/2016 | Ebcioglu et al. |
| 9,495,154 B2 | 11/2016 | Khan |
| 9,569,214 B2 | 2/2017 | Govindu et al. |
| 9,690,747 B2 | 6/2017 | Vorbach et al. |
| 9,697,318 B2 | 7/2017 | Hutton et al. |
| 9,698,794 B1 | 7/2017 | Fender et al. |
| 9,812,180 B2* | 11/2017 | Verma ............. H03K 19/17758 |
| 9,875,105 B2 | 1/2018 | Rozas et al. |
| 9,952,831 B1 | 4/2018 | Ross et al. |
| 10,033,403 B1* | 7/2018 | Thiagarajan ....... H03H 17/0416 |
| 10,037,227 B2 | 7/2018 | Therien et al. |
| 10,067,911 B2 | 9/2018 | Gholaminejad et al. |
| 10,445,098 B2 | 10/2019 | Fleming et al. |
| 10,642,630 B1 | 5/2020 | Shaddock et al. |
| 10,698,853 B2 | 6/2020 | Grohoski et al. |
| 10,713,403 B1 | 7/2020 | Agrawal et al. |
| 10,831,507 B2 | 11/2020 | Shah et al. |
| 11,307,873 B2* | 4/2022 | Halpern ................ G06F 9/4494 |
| 2001/0047509 A1 | 11/2001 | Mason et al. |
| 2002/0004916 A1 | 1/2002 | Marchand et al. |
| 2004/0049672 A1 | 3/2004 | Nollet et al. |
| 2004/0153608 A1 | 8/2004 | Vorbach et al. |
| 2005/0091468 A1 | 4/2005 | Morita et al. |
| 2005/0108503 A1 | 5/2005 | Sandon et al. |
| 2006/0010306 A1 | 1/2006 | Saito et al. |
| 2006/0190517 A1 | 8/2006 | Guerrero |
| 2007/0046326 A1 | 3/2007 | Fujisawa et al. |
| 2007/0180172 A1 | 8/2007 | Schmidt et al. |
| 2009/0031089 A1 | 1/2009 | Tuominen |
| 2009/0113169 A1 | 4/2009 | Yang et al. |
| 2009/0135739 A1 | 5/2009 | Hoover et al. |
| 2010/0161309 A1 | 6/2010 | Chartraire et al. |
| 2010/0268862 A1 | 10/2010 | Park et al. |
| 2010/0333058 A1 | 12/2010 | Goodnow et al. |
| 2011/0264723 A1 | 10/2011 | Yagain |
| 2012/0126850 A1 | 5/2012 | Wasson et al. |
| 2012/0126851 A1 | 5/2012 | Kelem et al. |
| 2012/0131257 A1 | 5/2012 | Rudosky et al. |
| 2013/0024621 A1 | 1/2013 | Choi et al. |
| 2013/0227255 A1 | 8/2013 | Kim |
| 2013/0326190 A1 | 12/2013 | Chung et al. |
| 2014/0092728 A1 | 4/2014 | Alvarez-Icaza Rivera et al. |
| 2014/0149480 A1 | 5/2014 | Catanzaro et al. |
| 2014/0237227 A1 | 8/2014 | Aizawa |
| 2014/0317628 A1 | 10/2014 | Kim |
| 2014/0331031 A1 | 11/2014 | Suh et al. |
| 2015/0052344 A1* | 2/2015 | Matsumoto .... H03K 19/017581 |
| | | 713/100 |
| 2015/0347192 A1 | 12/2015 | Blaine et al. |
| 2016/0012012 A1 | 1/2016 | Yen et al. |
| 2016/0139955 A1 | 5/2016 | Fee et al. |
| 2016/0246602 A1 | 8/2016 | Radhika et al. |
| 2017/0083313 A1 | 3/2017 | Sankaralingam et al. |
| 2017/0105130 A1 | 4/2017 | Chen et al. |
| 2017/0123794 A1* | 5/2017 | Chen ...................... G06F 9/3851 |
| 2017/0161204 A1 | 6/2017 | Roberts et al. |
| 2017/0185564 A1 | 6/2017 | Toichi |
| 2017/0317678 A1 | 11/2017 | Coole et al. |
| 2018/0024841 A1 | 1/2018 | Hiscock |
| 2018/0089117 A1 | 3/2018 | Nicol |
| 2018/0121121 A1 | 5/2018 | Mehra et al. |
| 2018/0143777 A1* | 5/2018 | Dasu ........................ G06F 3/061 |
| 2018/0157825 A1 | 6/2018 | Eksten et al. |
| 2018/0189231 A1 | 7/2018 | Fleming, Jr. et al. |
| 2018/0275193 A1 | 9/2018 | Rouge et al. |
| 2018/0349098 A1 | 12/2018 | Manohararajah |
| 2018/0367147 A1* | 12/2018 | Khor ................... H03K 19/1776 |
| 2019/0042513 A1 | 2/2019 | Fleming, Jr. et al. |
| 2019/0042924 A1 | 2/2019 | Pasca et al. |
| 2019/0056969 A1 | 2/2019 | Khandros et al. |
| 2019/0084296 A1 | 3/2019 | Shaul et al. |
| 2019/0087201 A1 | 3/2019 | Hiscock |
| 2019/0102179 A1* | 4/2019 | Fleming ................ G06F 9/3017 |
| 2019/0147323 A1 | 5/2019 | Li et al. |
| 2019/0171604 A1 | 6/2019 | Brewer |
| 2019/0205734 A1 | 7/2019 | Guntoro |
| 2019/0213153 A1 | 7/2019 | Pan et al. |
| 2019/0303297 A1* | 10/2019 | Fleming, Jr. ......... G06F 13/1668 |
| 2019/0317770 A1 | 10/2019 | Sankaralingam et al. |
| 2020/0125396 A1 | 4/2020 | Chynoweth et al. |
| 2020/0159544 A1 | 5/2020 | Shah et al. |
| 2020/0159692 A1 | 5/2020 | Shah et al. |
| 2021/0055940 A1 | 2/2021 | Shah et al. |
| 2021/0064975 A1 | 3/2021 | Purandare et al. |
| 2022/0197714 A1* | 6/2022 | Raumann ............ G06F 15/7867 |
| 2022/0198117 A1* | 6/2022 | Raumann ................ G06F 13/28 |
| 2023/0188420 A1* | 6/2023 | Tan ..................... H04L 41/0866 |
| | | 713/1 |

FOREIGN PATENT DOCUMENTS

| | | |
|---|---|---|
| CN | 101485576 A | 7/2009 |
| CN | 101593169 A | 12/2009 |
| CN | 103748574 B | 7/2016 |
| CN | 107636625 A | 1/2018 |
| CN | 108090022 A | 5/2018 |
| EP | 0733234 A1 | 9/1996 |
| EP | 1372084 A2 | 12/2003 |
| EP | 2441013 B1 | 8/2014 |

(56) References Cited

FOREIGN PATENT DOCUMENTS

| TW | 200801964 A | 1/2008 |
|---|---|---|
| TW | 200928736 A | 7/2009 |
| TW | 201346758 A | 11/2013 |
| TW | I502510 B | 10/2015 |
| TW | 201610708 A | 3/2016 |
| TW | 201730761 A | 9/2017 |
| TW | 201833767 A | 9/2018 |
| TW | I758770 B | 3/2022 |
| WO | 2010142987 A1 | 12/2010 |

OTHER PUBLICATIONS

CN 2020800135801—Voluntary Amendments with translation, dated Jan. 3, 2022, 16 pages.
EP 20702339.8 Response to Rules 161(1) and 162 Communication, filed Feb. 25, 2022, 10 pages.
TW 108142191—Response to First Office Action dated Nov. 3, 2021, filed Jan. 26, 2022, 9 pages.
TW 108142191—Notice of Allowance, dated Feb. 21, 2022, 2 pages.
U.S. Appl. No. 17/093,543—Response to Office Action dated Oct. 12, 2021, filed Jan. 20, 2022, 4 pages.
CA 3120683—Response to First Office Action dated Sep. 1, 2021, filed Dec. 31, 2021, 4 pages.
EP 198213613—Response to Rules 161(1) and 162 Communication dated Jul. 1, 2021, filed Jan. 11, 2022, 12 pages.
EP 19829712.9—Rules 161(1) and 162 Communication, dated Jun. 30, 2021, 3 pages.
EP 19829712.9—Response to Rules 161(1) and 162 Communication dated Jun. 30, 2021, filed Jan. 10, 2022, 11 pages.
U.S. Appl. No. 16/260,548—Response to Office Action dated Dec. 26, 2019, filed Mar. 10, 2020, 11 pages.
PCT/US2020/040832—International Prelimiary Report on Patentability, dated Jan. 20, 2022, 16 pages.
TW 109122772—Response to First Office Action dated Aug. 27, 2021, filed Nov. 29, 2021, 15 pages.
U.S. Appl. No. 17/378,342—Response to Office Action dated Oct. 26, 2021, filed Dec. 15, 2021, 15 pages.
U.S. Appl. No. 17/378,342—Final Office Action, dated Jan. 12, 2022, 30 pages.
U.S. Appl. No. 17/378,342—Response to Final Office Action dated Jan. 12, 2022, filed Mar. 4, 2022, 15 pages.
U.S. Appl. No. 17/378,391—Response to Office Action dated Nov. 18, 2021, filed Feb. 17, 2022, 10 pages.
U.S. Appl. No. 17/378,399—Response to Office Action dated Dec. 9, 2021, filed Mar. 1, 2022, 9 pages.
U.S. Appl. No. 16/407,675 Notice of Allowance dated Mar. 14, 2022, 12 pages.
U.S. Appl. No. 17/093,543—Office Action dated Apr. 19, 2022, 32 pages.
CA 3120683—Notice of Allowance dated Feb. 17, 2022, 1 page.
TW 110101760—First Office Action dated Mar. 29, 2022, 12 pages.
TW 109114892—Notice of Allowance, dated Apr. 11, 2022, 3 pages.
PCT/US2020/040832—International Preliminary Report on Patentability, dated Jan. 20, 2022, 16 pages.
EP 20743938.1—Rules 161(1) and 162 Communication, dated Feb. 15, 2022, 3 pages.
CA 3125707—First Office Action, dated Jan. 21, 2022, 3 pages.
CA 3125707—Voluntary Amendments, dated Jan. 4, 2022, 8 pages.
CN 201980089713—First Office Action, dated Feb. 16, 2022, 6 pages.
EP 20730358—Rules 161(1) and 162 Communication, dated Dec. 17, 2021, 3 pages.
Kuo, et al.., "Efficient Spare Allocation for Reconfigurable Arrays," in IEEE Design & Test of Computers, vol. 4, No. 1, pp. 24-31, Feb. 1987.
Rubin, et al., "Choose-your-own-adventure routing: Lightweight load-time defect avoidance," ACM Transactions on Reconfigurable Technology and Systems, vol. 4, No. 4, Article 33, Dec. 4, 2011, pp. 1-24.
Trimberger, "Defect avoidance in programmable devices," IET Computers & Digital Techniques, vol. 9, iss. 4, Aug. 14, 2015, pp. 188-189.
U.S. Office Action in U.S. Appl. No. 17/378,399 dated Dec. 9, 2021, 10 pages.
Wang et al., "An Overview of Micron's Automate Processor," Proc. of the 11th IEEE/ACM/IFIP Int'l Conf. on Hardware/Software Codesign and System Synthesis, No. 14, Oct. 1, 2016, 3 pages.
Zhang et al., "Fault Tolerance Mechanism in Chip Many-Core Processors," Tsinghua Science and Technology, vol. 12, No. S1, Jul. 2007, pp. 169-174.
AMBA AXI and ACE Protocol Specification, ARM, as early as Jan. 2003, 440 pages.
Ando et al., "A Multithreaded CGRA for Convolutional Neural Network Processing," Scientific Research Publishing, Circuits and Systems, Jun. 2017, pp. 149-170.
De Sutter et al., "Coarse-Grained Reconfigurable Array Architectures," 2010 Handbook of Signal Processing Systems, 37 pages.
Fiolhais et al., "Overlay Architectures for Space Applications," SpacE FPGA Users Workshop, Apr. 9-11, 2018, pp. 1-20.
Harris et al., "Architectures and Algorithms for User Customization of CNNs," ASP-DAC 2018, 32 pages.
Hartenstein, "Coarse Grain Reconfigurable Architectures," IEEE, 2001, 6 pages.
Iannucci, "Toward a dataflow/von Neumann hybrid architecture," ISCA '88 Proc. of the 15th Annual ISCA, May 30-Jun. 2, 1988, 10 pages.
Jafri et al., "NeuroCGRA: A CGRAs with Support for Neural Networks," 2014 International Conference on High Performance Computing & Simulation (HPCS), 8 pages.
Koeplinger et al., "Spatial: A Language and Compiler for Application Accelerators," PLDI '18, Jun. 18-22, 2018, Association for Computng Machinery, 16 pages.
Li, et al., "CATERPILLAR: Coarse Grain Reconfigurable Architecture for Accelerating the Training of Deep Neural Networks," arXiv: 1706.00517v2 [cs.DC], Jun. 8, 2017, 10 pages.
Nicol, "A Course Grain Reconfigurable Array (CGRA) for Statically Scheduled Data Flow Computing," Wave Computing, May 3, 2017, 9 pages.
Nicol, "Wave Computing: A Dataflow Processing Chip for Training Deep Neural Networks," 2017, 25 pages.
Paek et al., "Binary Acceleration Using Coarse-Grained Reconfigurable Architecture," ACM SIGARCH Computer Architecture News, vol. 38, No. 4, Sep. 2010, 7 pages.
Tanomoto et al., "A CGRA-based Approach for Accelerating Convolutional Neural Networks," 2015 IEEE 9th International Symposium on Embedded Multicore/Many-core Systems-on-Chip, 2015, pp. 73-80.
U.S. Appl. No. 16/197,826—Notice of Allowance dated Jun. 29, 2020, 11 pages.
Vadivel et al., "Loop Overhead Reduction Techniques for Coarse Grained Reconfigurable Architectures," ResearchGate, Conference Paper, Aug. 2017, https://www.researchgate.net/publication/319416458, 9 pages.
Vranjkovic et al., "Coarse-Grained Reconfigurable Hardware Accelerator of Machine Learning Classifiers," IWSSIP 2016, The 23rd International Conference on Systems, Signals and Image Processing, May 23-25, 2016, Bratislava, Slovakia, 5 pages.
Wang, et al., "Reconfigurable Hardware Accelerators: Opportunities, Trends and Challenges," Cornell University, Dec. 13, 2017, 25 pages.
Wijtvliet et al., "Coarse Grained Reconfigurable Architectures in the Past 25 Years: Overview and Classification," IEEE 2016, pp. 235-244.
Wijtvliet, Course Syllabus for "Accelerators and Coarse Grained Reconfigurable Architectures," Advanced School for Computing and Imaging, 2017, 2 pages.

(56) References Cited

OTHER PUBLICATIONS

Zhang, "Design of Coarse-Grained Reconfigurable Architecture for Digital Signal Processing," Implementation Aspects, Master of Science Thesis, Feb. 2009, 110 pages.
U.S. Appl. No. 16/239,252—Office Action dated Aug. 7, 2019, 8 pages.
U.S. Appl. No. 16/239,252—Response to Final Office Action dated Jan. 8, 2020, filed Jan. 24, 2020, 14 pages.
U.S. Appl. No. 16/260,548 Office Action dated Dec. 26, 2019, 9 pages.
U.S. Appl. No. 16/239,252—Notice of Allowance dated Feb. 12, 2020, 10 pages.
Prabhakar, et al., "Plasticine: A Reconfigurable Architecture for Parallel Patterns", pp. 389-402, IEEE, Jun. 24, 2017.
PCT/US2019/062287—International Search Report and Written Opinion dated Feb. 5, 2020, 18 pages.
U.S. Appl. No. 16/260,548—Notice of Allowance dated Apr. 29, 2020, 15 pages.
Tobuschat, et al., "IDAMC: A NoC for mixed criticality systems," 2013 IEEE 19th International Conference on Embedded and Real-Time Computing Systems and Applications, Taipei, Aug. 19-21, 2013, pp. 149-156.
PCT/US2020/012079—International Search Report and Written Opinion dated Apr. 29, 2020, 18 pages.
U.S. Appl. No. 16/239,252—Notice of Allowance dated May 14, 2020, 15 pages.
U.S. Appl. No. 16/407,675 Office Action, dated May 18, 2020, 9 pages.
U.S. Appl. No. 16/197,826—Notice of Allowance dated May 18, 2020, 22 pages.
PCT/US2019/062289—International Search Report and Written Opinion dated Feb. 28, 2020, 14 pages.
Anonymous, Activation Function, Wikipedia, Retrieved on Dec. 3, 2021, 5 pages. Retrieved from [ URL: https://en.wikipedia.org/wiki/Activation_function ].
Basterretxea et al., "Approximation of sigmoid function and the derivative for hardware implementation of artificial neurons," IEE Proceedings—Circuits, Devices and Systems, vol. 151, Issue 1, Feb. 5, 2004, 7 pages.
Eppler et al. ,"High speed neural network chip for trigger purposes in high energy physics," IEEE, Proc. of the conference on design, automation and test in Europe, Feb. 1998, 8 pages.
Gomar et al. "Precise digital implementations of hyperbolic tanh and sigmoid function," 2016 50th Asilomar Conference on Signals, Systems and Computers, Nov. 6-9, 2016, 4 pages.
Lin et al., "A Digital Circuit Design of Hyperbolic Tangent Sigmoid Function for Neural Networks," 2018 IEEE Int'l Symp. on Circuits and Systems, May 18-21, 2018, 4 pages.
Turkson et al. "Artificial neural network applications in the calibration of spark-ignition engines: An overview," Engineering Science and Technology, an International Journal, vol. 19, Issue 3, Sep. 2016, 1346-1359.
PCT/US2020/014652—International Search Report and Written Opinion dated May 26, 2020, 9 pages.
PCT/US2019/062287—Response to Chapter II, Sep. 1, 2020, 17pgs.
TW 108148376—Notice of Allowance dated Oct. 23, 2020, 5 pages.
TW 108148376—Request for Exam and Voluntary Amendment filed Jun. 30, 2020, 17 pages.
U.S. Appl. No. 16/407,675—Office Action dated Oct. 29, 2020, 7 pages.
U.S. Appl. No. 16/504,627 Office Action dated Nov. 13, 2020, 8 pages.
PCT/US2020/012079 Response to Chapter II Demand, Nov. 3, 2020, 25 pages.
PCT/US2019/062289—Response to Chapter II Demand, Sep. 15, 2020, 11 pages.
PCT/US2020/32186—International Search Report and Written Opinion dated Aug. 14, 2020; 21 pages.
80.192.25.230: "Producer-consumer problem", Feb. 7, 2013 (Feb. 7, 2013), XP055530821, Retrieved from the Internet: URL:https://en.wikipedia.org/w/index.php?t>itle=Producer%E2%80%93consumer_problem&oldid=537111527[retrieved on Dec. 6, 2018], 4 pages.
Benoit et al: "Automatic Task Scheduling/ Loop Unrolling using Dedicated RTR Controllers in Coarse Grain Reconfigurable Architectures", Parallel and Distributed Processing Symposium, 2005. Proceedings. 19th IEEE International Denver, CO, USA Apr. 4-8, 2005, Piscataway, NJ, USA,IEEE, Apr. 4, 2005 (Apr. 4, 2005), pp. 148a-148a, XP010785667, DOI: 10.1109/IPDPS.2005.119, ISBN: 978-0-7695-2312-5, 8 pages.
PCT/US2020/040832—International Search Report and the Written Opinion dated Sep. 18, 2020, 18 pages.
TW 109102852—Office Action dated Jul. 29, 2020, 6 pages.
U.S. Appl. No. 16/504,627 Office Action dated Feb. 12, 2021, 10 pages.
U.S. Appl. No. 16/862,445—Office Action dated Mar. 18, 2021, 25 pages.
Hatori et al., "Introducing redundancy in field programmable gate arrays," Proceedings of IEEE Custom Integrated Circuits Conference—CICC '93, May 9-12, 1993, pp. 7.1.1-7.1.4.
Wentzlaff et al: "On-Chip Interconnection Architecture of the Tile Processor", IEEE Micro, IEEE Service Center, Los Alamitos, CA, US, vol. 27, No. 5, Sep. 1, 2007 (Sep. 1, 2007), pp. 15-31, XP011196754.
U.S. Appl. No. 16/198,086—Notice of Allowance dated Jan. 15, 2021, 23 pages.
TW 109102852 Voluntary Amendment, dated Jul. 10, 2020, 19 pages.
TW 109102852 First Office Action, dated Jul. 29, 2020, 30 pages.
TW 109102852 Response to First Office Action, dated Jul. 29, 2020, 70 pages.
TW 109102852 Notice of Allowance, dated Nov. 6, 2020, 3 pages.
PCT-US2020-012079 International Preliminary Report on Patentability, dated May 7, 2021, 14 pages.
U.S. Appl. No. 16/504,627—Notice of Allowance dated Apr. 16, 2021, 26 pages.
U.S. Appl. No. 16/862,445 Response to Office Action dated Mar. 18, 2021, filed Jun. 9, 2021, 12 pages.
U.S. Appl. No. 16/198,086—Notice of Allowance (after RCE) dated Jun. 28, 2021, 9 pages.
Podobas et al., A Survey on Coarse-Grained Reconfigurable Architectures From a Performance Perspective, IEEEAccess, vol. 2020. 3012084, Jul. 27, 2020, 25 pages.
M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.
PCT/US2019/062287 International Preliminary Report on Patentability, dated Feb. 19, 2021, 31 pages.
U.S. Appl. No. 16/407,675—Notice of Allowance dated Jun. 1, 2021, 7 pages.
PCT/US2019/062289—International Preliminary Report on Patentability dated Feb. 19, 2021, 27 pages.
TW 109114892—First Office Action dated Jul. 22, 2021, 7 pages.
PCT/US2020/032186—3rd Party Observation dated Jul. 13, 2021, 20 pages.
PCT/US2020/040832—3rd Party Observation dated Jul. 12, 2021, 20 pages.
PCT/US2020/014652 International Preliminary Report on Patentability, dated Aug. 12, 2021, 7 pages.
U.S. Appl. No. 16/407,675 Response to Final Office Action dated Oct. 29, 2020, filed Dec. 23, 2020, 8 pages..
U.S. Appl. No. 16/407,675 Response to First Office Action dated May 18, 2020, filed Jul. 10, 2020, 11 pages. .
U.S. Appl. No. 16/504,627 Response to Non-Final Office Action dated Nov. 13, 2020, filed Feb. 2, 2021, 6 pages.
TW 109114892—First Office Action dated Jul. 22, 2021, 9 pages.
TW 109122772—First Office Action dated Aug. 27, 2021, 11 pages.
PCT/US2020/012079—Second Article 34 Amendment (Response to Informal Communication by Telephone) dated Feb. 2, 2021, as filed on Apr. 2, 2021, 5 pages.
U.S. Appl. No. 16/504,627—312 Amendment in response to Notice of Allowance dated Apr. 16, 2021 as filed on May 17, 2021, 22 pages.

(56) References Cited

OTHER PUBLICATIONS

U.S. Office Action in U.S. Appl. No. 17/378,391 dated Nov. 18, 2021, 7 pages.
U.S. Office Action in U.S. Appl. No. 17/378,342 dated Oct. 26, 2021, 18 pages.
CA 3120683—First Office Action dated Sep. 1, 2021, 3 pages.
U.S. Appl. No. 16/862,445 Notice of Allowance, dated Sep. 17, 2021, 15 pages.
U.S. Appl. No. 17/093,543 Office Action dated Oct. 12, 2021, 20 pages.
TW 108142191—First Office Action dated, Nov. 3, 2021, 17 pages.
EP 207029398 Rules 161(1) and 162 Communication, dated Aug. 18, 2021, 3 pages.
CA 3120683 Voluntary Amendments, dated Aug. 4, 2021, 9 pages.
EP 198213613 Rules 161(1) and 162 Communication, dated Jul. 1, 2021, 3 pages.
PCT/US2020/032186 International Preliminary Report on Patentability, dated Nov. 18, 2021, 15 pages.
TW 109114892—Response to First Office Action dated Jul. 22, 2021, filed Oct. 26, 2021, 16 pages.
U.S. Appl. No. 16/239,252 Final Office Action, dated Jan. 8, 2020, 13 pages.
TW110101760—Notice of Allowance, dated Sep. 21, 2022, 2 pages.
U.S. Appl. No. 17/322,697—Non-Final Office Action, dated Apr. 7, 2023, 19 pages.

\* cited by examiner

FIG. 9

| | | | | | | |
|---|---|---|---|---|---|---|
| A0 | First of Z1 chunks for each of W Switch Units<br>First of Z2 chunks for each of X PCU Units<br>First of Z3 chunks for each of Y PMU Units<br>First of Z4 chunks for each of Z AGCU Units | Block (0) | | | | |
| A1 | Second of Z1 chunks for each of W Switch Units<br>Second of Z2 chunks for each of X PCU Units<br>Second of Z3 chunks for each of Y PMU Units<br>Second of Z4 chunks for each of Z AGCU Units | Block (1) | | | | |
| A2 | Third of Z2 chunks for each of X PCU Units<br>Third of Z3 chunks for each of Y PMU Units<br>Third of Z4 chunks for each of Z AGCU Units | Block (2) | | | | |
| A3 | Fourth of Z3 chunks for each of Y PMU Units<br>Fourth of Z4 chunks for each of Z AGCU Units | Block (3) | | | | |
| A4 | Fifth of Z3 chunks for each of Y PMU Units<br>Fifth of Z4 chunks for each of Z AGCU Units | Block (4) | | | | |
| A5 | Sixth of Z4 chunks for each of Z AGCU Units | Block (5) | | | | |
| • • • | | • • • | | | | |

EFFICIENT DECONFIGURATION OF A RECONFIGURABLE DATA PROCESSOR

PRIORITY APPLICATION

This application is a continuation of co-pending U.S. Nonprovisional patent application Ser. No. 16/198,086, filed Nov. 21, 2018, entitled "Configuration Unload of a Reconfigurable Data Processor". The priority application is incorporated by reference for all purposes as if fully set forth herein.

BACKGROUND

Technological Field

The present technology relates to configuration of reconfigurable architectures, can be particularly applied to configuration of coarse-grain reconfigurable architectures.

Description of Related Art

Reconfigurable processors, including field programmable gate arrays FPGAs, can be configured to implement a variety of functions more efficiently or faster than might be achieved using a general purpose processor executing a computer program. So called coarse-grain reconfigurable architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Configuration of reconfigurable processors involves compilation of a configuration description to produce a configuration file, referred to sometimes as a bitstream or bit file, and distributing the configuration file to the configurable units on the processor. To start a process, the configuration file must be loaded for that process. To change a process, the configuration file must be replaced with the new configuration file.

The procedures and supporting structures for distributing and loading configuration files can be complex, and the execution of the procedures can be time consuming.

In order to maximize operating efficiency, and be able to swap programs on a reconfigurable processor, a means of efficiently loading configuration state and storing configuration and program state is needed.

SUMMARY

A technology is described which enables efficient loading and unloading of configuration and control state for a Coarse-Grained Reconfigurable Array processor, which contain programmable elements arranged in a grid, or tile, and other types of reconfigurable processors.

Technology described herein provides for the ability to load configuration data from a formatted configuration file stored in memory, and transferred to the reconfigurable processor via a combination of parallel and serial techniques. Also, technology described herein provides an efficient means of unloading program control and data state into a similarly formatted unload configuration file. In combination, the load and unload technologies can support protocols to quickly swap programs into and out of a reconfigurable processor to enable time-sharing and other virtualization techniques.

Configuration and reconfiguration procedures and structures are described herein usable for a reconfigurable processor which comprises a bus system, and one or more arrays of configurable units connected to the bus system. Configurable units in the one or more arrays include configuration data stores, implemented using for example serial chains of latches, to store configuration data referred to herein as unit files. The unit file particular to a configurable unit can comprise a plurality of sub-files of configuration data. In examples described herein, the sub-files consist of a "chunk" of data having a size suited to efficient distribution using the bus system.

Configurable units in the plurality of configurable units can each include logic to execute a unit configuration load process, including receiving via the bus system, sub-files of a unit file particular to the configurable unit, and loading the received sub-files into the configuration store of the configurable unit. In some embodiments, configurable units in the plurality of configurable units use routes in the bus system during execution after configuration that are also used in the configuration load process.

A configuration load controller is described which includes logic to execute an array configuration load process. An array configuration load process includes distributing a configuration file comprising unit files for a plurality of the configurable units in the array to implement a machine.

In one aspect of the technology, the unit files can be organized to comprise a plurality of ordered sub-files. The unit files particular to different configurable units may have different numbers of ordered sub-files in some embodiments. The configuration file for an array of configurable units is arranged so that sub-files of the unit files are interleaved with other sub-files of the same order for other unit files, and arranged so that location of a sub-file in the configuration file implies the configurable unit in the array of the sub-file and its order in the unit file particular to the configurable unit.

An example of an array configuration load process described herein executes by sending sub-files to a plurality of configurable units in the array, in a distribution sequence of N rounds (round R(i) for i=0 to N−1). In each round R(i), the process transfers one sub-file of order (i) via the bus system to the configurable units having unit files including up to (i+1) sub-files.

The configuration data stores in configurable units in the plurality of configurable units can comprise serial chains, and the unit configuration load process can execute by receiving, in one bus cycle, all or part of a first sub-file of the unit file particular to the configurable unit from the bus system in one round of the distribution sequence, and beginning to push the received first sub-file into the serial chain during subsequent bus cycles before receiving a second sub-file in a next round of the distribution sequence, and receiving the second sub-file in the next round of the distribution sequence from the bus system in a later bus cycle, beginning to push the received second sub-file into the serial chain during bus cycles after pushing earlier received sub-files into the serial chain.

In some rounds of the distribution sequence, the first sub-file is consumed by the unit configuration load process in the configurable unit before the second sub-file in the plurality of ordered sub-files is received by the configurable unit.

The array can include more than one type of configurable unit, and the unit files for different types of configurable units can include different numbers of sub-files of configuration data. For example, the unit files for a first type of configurable unit include Z1 chunks, and the unit files for a second type of configurable unit include Z2 chunks, where Z1 is less than Z2. The array configuration load process can include retrieving segments of the configuration file including sub-file (i) of the unit files for all of the configurable units of a first type and the second type to be distributed in round R(i), for (i) going from 0 to Z1−1, and then retrieving segments of the configuration file including sub-file (i) of the unit files for all of the configurable units of the second type to be distributed in round R(i), for (i) going from Z1 to Z2−1. This protocol can be extended to any number of types of configurable units having different numbers of sub-files in their unit files.

In one technique to initiate the array configuration load process, a configuration load command identifying a location in memory of the configuration file can be received from a host process, and in response to the command, the process generates one or more memory access requests. As the requested portions of the configuration file are returned, the distribution sequence can be executed.

The sub-files of the plurality of unit files can be arranged in the configuration file in an interleaved fashion that matches the distribution sequence. This arrangement of the configuration files enables the configuration load process to imply the configurable unit, and the position in the plurality of ordered sub-files of each sub-file by the location of the sub-file in the configuration file. The array configuration load process can include routing the sub-files to configurable units based on locations of the sub-files in the configuration file.

The plurality of configurable units receiving configuration data by the array configuration load process can include all the configurable units in the array of configurable units. In instances in which the machine being implemented by the configuration file does not utilize all of the configurable units, the unit file for one or more of unused configurable units can implement a no-operation configuration. Also, the array configuration load process can be configured such that the plurality of configurable units receiving configuration data by the array configuration load process includes fewer than all of the configurable units in the array of configurable units.

Configurable units in the array of configurable units in an example described herein include respective load complete status logic connected in a daisy chain starting and ending at the array configuration load logic. In a procedure to confirm successful loading of a configuration file using the daisy chain, the array configuration load logic forwards a configuration load complete signal on the daisy chain after the configuration file is distributed, and in each configurable unit in the array, the configuration load complete status logic forwards the configuration load complete signal on the daisy chain when the configuration load complete signal from a previous member of the chain is received and loading of its own unit file is completed.

A bus system is described herein that supports a plurality of arrays of configurable units, where each array can be referred to as a tile. The bus system described includes a top level network connected to an external data interface (such as one or more PCIE or DDR type interfaces) and to an array interface for each tile, and an array level network connected to the array interface for the corresponding tile, and to the configurable units in the array of configurable units. The array configuration load process can include receiving, from a host process, a configuration load command identifying a location in memory of the configuration file, and generating one or more memory access requests via the top level network in response to the command to retrieve the configuration file through the external data interface. The array configuration load process can route sub-files to configurable units via the array level network using addresses implied by location of the sub-files in the configuration file.

A configuration unload controller is described including logic to execute an array configuration unload process, including distributing an unload command to a plurality of the configurable units in the array to unload the unit files particular to the corresponding configurable units, the unit files each comprising a plurality of ordered sub-files, receiving at the configuration unload controller sub-files from the array of configurable units. A configuration unload file is assembled by arranging the received sub-files in memory according to the configurable unit of the unit file of which the sub-file is a part, and the order of the sub-file in the unit file. The structure of the configuration unload file can be the same as the structure of the configuration file describe above. Configurable units in the plurality of configurable units can include logic to execute a unit configuration unload process, including unloading the sub-files from the configuration store of the configurable unit and transmitting via the bus system (e.g., via an array level network), sub-files of a unit file particular to the configurable unit to the configuration unload controller. The unloaded sub-files need not be received by the configuration unload controller in any particular order. The configuration unload controller then transmits the unit sub-files to memory over the bus system (e.g., via a top level network).

Methods for configuring a reconfigurable data processor are also provided.

Other aspects and advantages of the technology described herein can be seen on review of the drawings, the detailed description and the claims, which follow.

BRIEF DESCRIPTION OF THE DRAWINGS

FIG. 9 illustrates an example organization of a configuration file.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Figure 1:
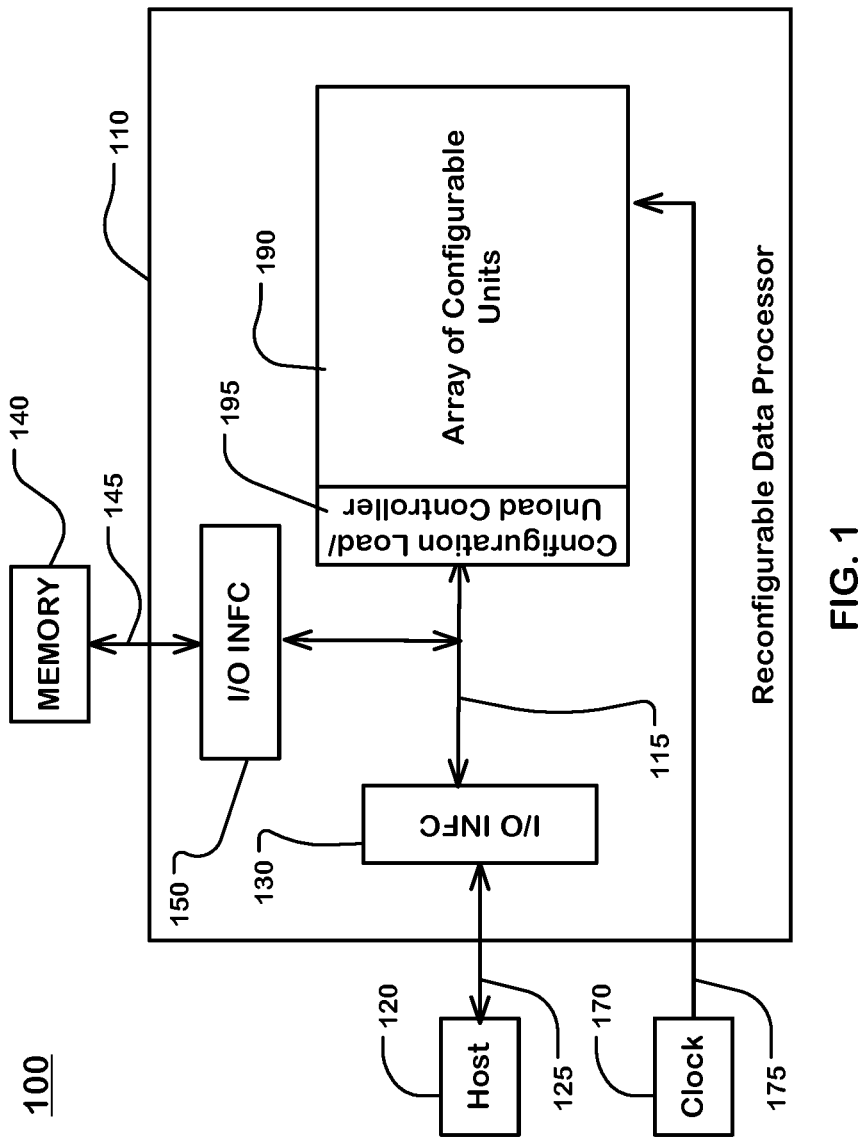
FIG. 1 is a system diagram illustrating a system including a host, a memory, and a reconfigurable data processor.

FIG. 1 is a system diagram illustrating a system including a host 120, a memory 140, and a reconfigurable data processor 110. As shown in the example of FIG. 1, the reconfigurable data processor 110 includes an array 190 of configurable units and a configuration load/unload controller 195. The phrase "configuration load/unload controller", as used herein, refers to a combination of a configuration load controller and a configuration unload controller. The configuration load controller and the configuration unload controller may be implemented using separate logic and data path resources, or may be implemented using shared logic and data path resources as suits a particular embodiment. In some embodiments, a system may include only a configuration load controller of the types described herein. In some embodiments, a system may include only a configuration unload controller of the types described herein.

The processor 110 includes an external I/O interface 130 connected to the host 120, and external I/O interface 150 connected to the memory 140. The I/O interfaces 130, 150 connect via a bus system 115 to the array 190 of configurable units and to the configuration load/unload controller 195. The bus system 115 may have a bus width of carrying one chunk of data, which can be for this example 128 bits (references to 128 bits throughout can be considered as an example chunk size more generally). In general, a chunk of the configuration file can have a number N of bits of data, and the bus system can be configured to transfer N bits of data in one bus cycle, where N is any practical bus width. A sub-file distributed in the distribution sequence can consist of one chunk, or other amounts of data as suits a particular embodiment. Procedures are described herein using sub-files consisting of one chunk of data each. Of course, the technology can be configured to distribute sub-files of different sizes, including sub-files that may consist of two chunks distributed in two bus cycles for example.

To configure configurable units in the array 190 of configurable units with a configuration file, the host 120 can send the configuration file to the memory 140 via the interface 130, the bus system 115, and the interface 150 in the reconfigurable data processor 110. The configuration file can be loaded in many ways, as suits a particular architecture, including in data paths outside the configurable processor 110. The configuration file can be retrieved from the memory 140 via the memory interface 150. Chunks of the configuration file can then be sent in a distribution sequence as described herein to configurable units in the array 190 of configurable units in the reconfigurable data processor 110.

An external clock generator 170 or other clock signal sources can provide a clock signal 175 or clock signals to elements in the reconfigurable data processor 110, including the array 190 of configurable units, and the bus system 115, and the external data I/O interfaces.

Figure 2:
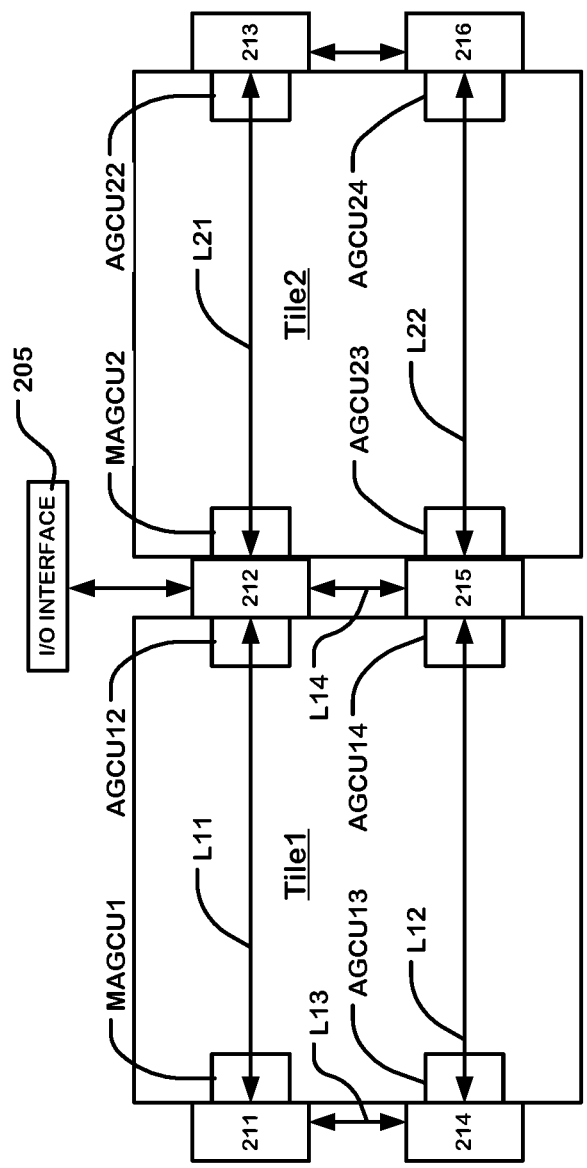
FIG. 2 is a simplified block diagram of a top level network and components of a CGRA (Coarse Grain Reconfigurable Architecture).

FIG. 2 is a simplified block diagram of components of a CGRA (Coarse Grain Reconfigurable Architecture) processor. In this example, the CGRA processor has 2 tiles (Tile1, Tile2). The tile comprises an array of configurable units connected to a bus system, including an array level networks in this example. The bus system includes a top level network connecting the tiles to external I/O interface 205 (or any number of interfaces). In other embodiments, different bus system configurations may be utilized. The configurable units in each tile are nodes on the array level network in this embodiment.

Each of the four tiles has 4 AGCUs (Address Generation and Coalescing Units) (e.g. MAGCU1, AGCU12, AGCU13, AGCU14). The AGCUs are nodes on the top level network and nodes on the array level networks, and include resources for routing data among nodes on the top level network and nodes on the array level network in each tile.

Nodes on the top level network in this example include one or more external I/O, including interface 205. The interfaces to external devices include resources for routing data among nodes on the top level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top level network and the array level network or networks.

The top level network is constructed using top level switches (211-216) connecting to each other as well as to other nodes on the top level network, including the AGCUs, and I/O interface 205. The top level network includes links (e.g. L11, L12, L21, L22) connecting the top level switches. Data travel in packets between the top level switches on the links, and from the switches to the nodes on the network connected to the switches. For example, top level switches 211 and 212 are connected by a link L11, top level switches 214 and 215 are connected by a link L12, top level switches 211 and 214 are connected by a link L13, and top level switches 212 and 213 are connected by a link L21. The links can include one or more buses and supporting control lines, including for example a chunk-wide bus (vector bus). For example, the top level network can include data, request and response channels operable in coordination for transfer of data in a manner analogous to an AXI compatible protocol. See, AMBA® AXI and ACE Protocol Specification, ARM, 2017.

Top level switches can be connected to AGCUs. For example, top level switches 211, 212, 214 and 215 are connected to MAGCU1, AGCU12, AGC U13 and AGCU14 in the tile Tile1, respectively. Top level switches 212, 213, 215 and 216 are connected to MAGCU2, AGCU22, AGCU23 and AGCU24 in the tile Tile2, respectively.

Top level switches can be connected one or more external I/O interfaces (e.g. interface 205).

Figure 3A:
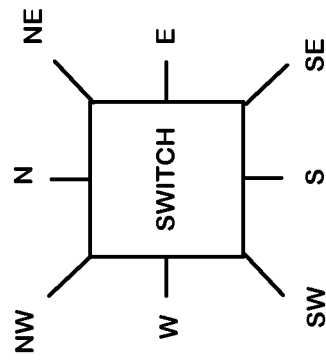
FIG. 3A illustrates an example switch unit connecting elements in an array level network.
Figure 3:
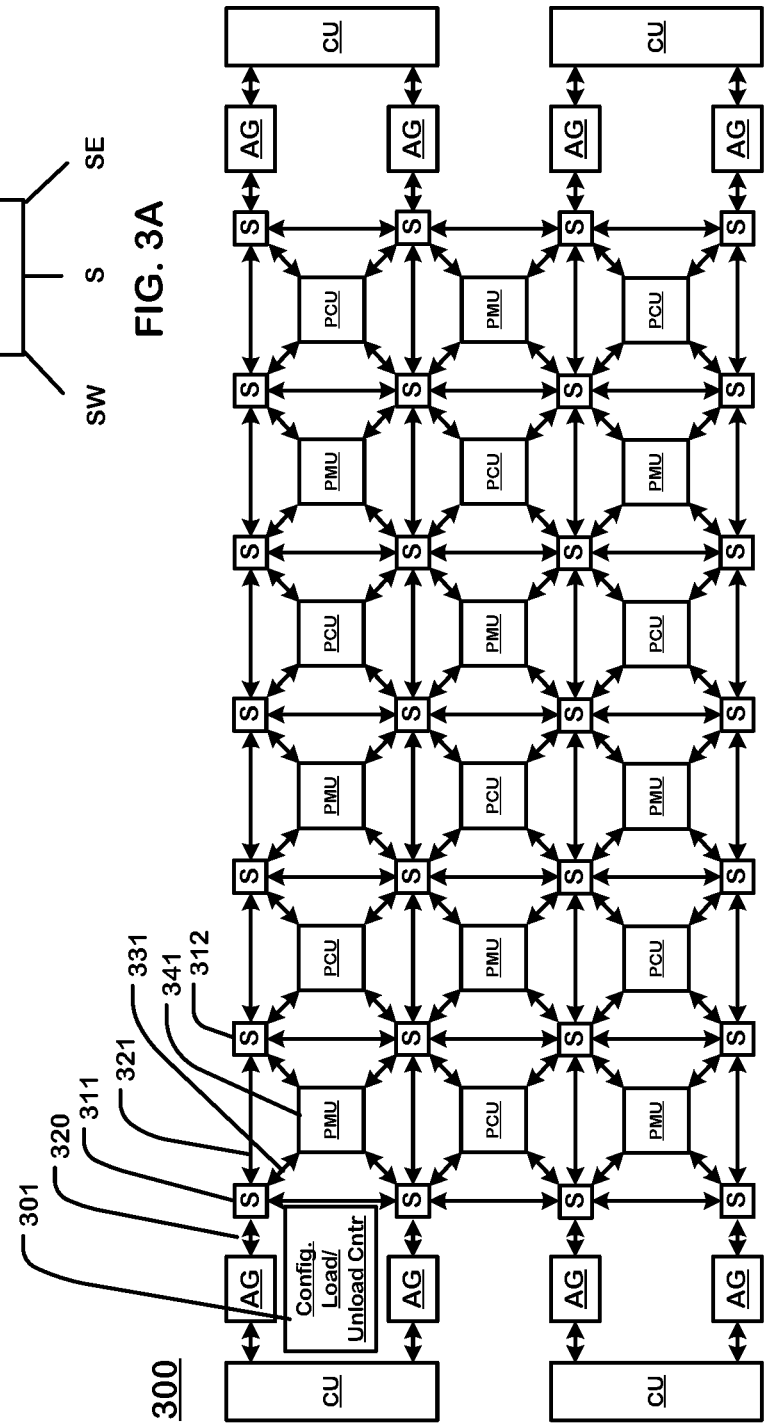
FIG. 3 is a simplified diagram of a tile and an array level network usable in the configuration of FIG. 2, where the configurable units in the array are nodes on the array level network.

FIG. 3 is a simplified diagram of a tile and an array level network usable in the configuration of FIG. 2, where the configurable units in the array are nodes on the array level network.

In this example, the array of configurable units 300 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units based on the contents of the bit file to allow all the components to execute a program (i.e., a machine). Program Load may also require the load of all PMU memories.

The array level network includes links interconnecting configurable units in the array. The links in the array level network include one or more and, in this case three, kinds of physical buses: a chunk-level vector bus (e.g. 128 bits of data), a word-level scalar bus (e.g. 32 bits of data), and a multiple bit-level control bus. For instance, interconnect 321 between switch units 311 and 312 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can includes:

A bit to indicates if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most significant bit first order of Chunk 5->Chunk 4->Chunk 3->Chunk 2->Chunk 1->Chunk 0. (Note that this most significant bit first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 3A illustrates an example switch unit connecting elements in an array level network. As shown in the example of FIG. 3A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 341 can be sent from the configuration load/unload controller 301 to the PMU 341, via a link 320 between the configuration load/unload controller 301 and the West (W) vector interface of the switch unit 311, the switch unit 311, and a link 331 between the Southeast (SE) vector interface of the switch unit 311 and the PMU 341.

Figure 4:
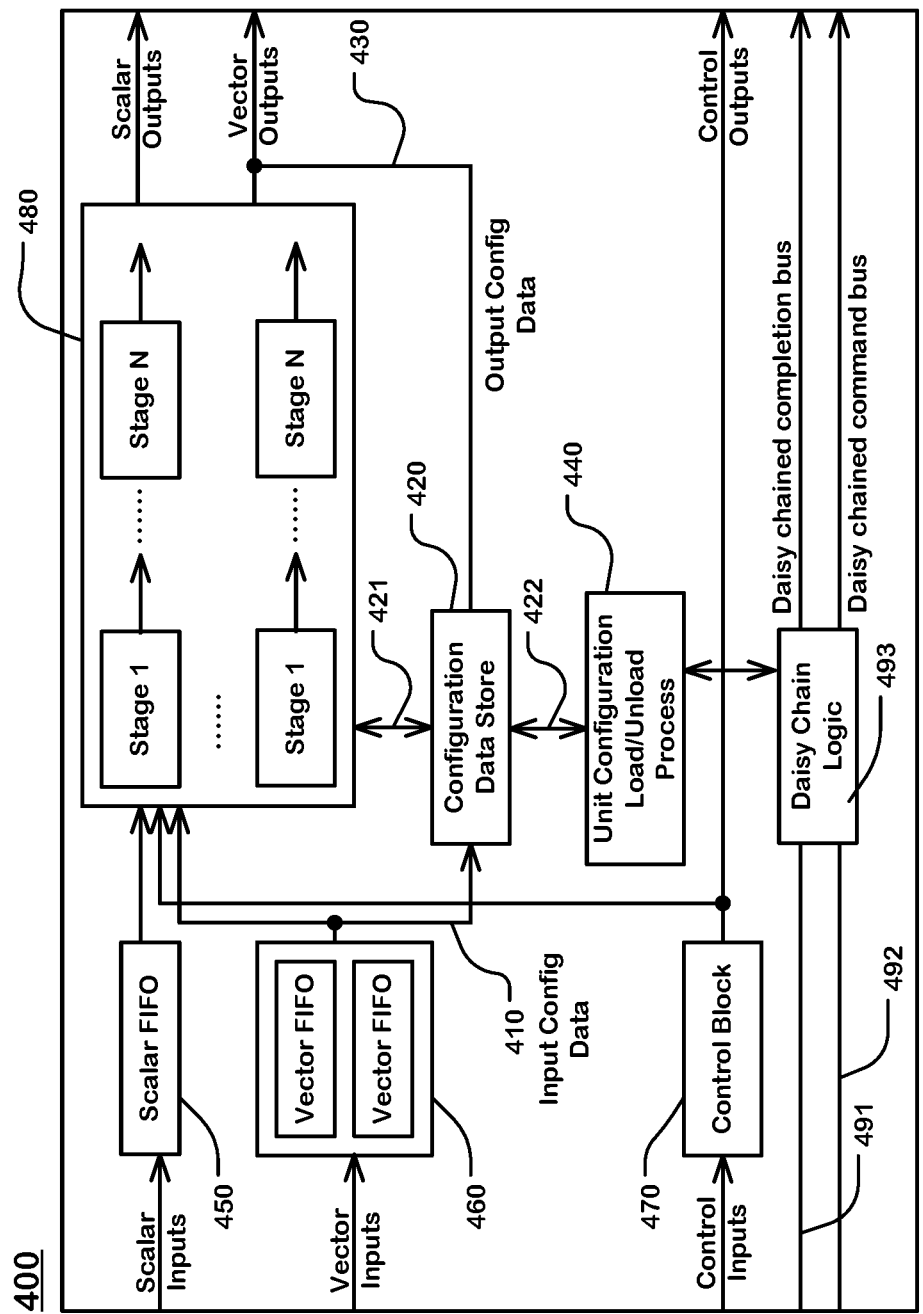
FIG. 4 is a block diagram illustrating an example configurable unit.

In this example, one of the AGCUs is configured to be a master AGCU, which includes a configuration load/unload controller (e.g. 301). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy chained command bus (FIG. 4). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top level network. The data read from memory are transmitted by the master AGCU over the vector interface on the array level network to the corresponding configurable unit according to a distribution sequence described herein.

Figure 6:
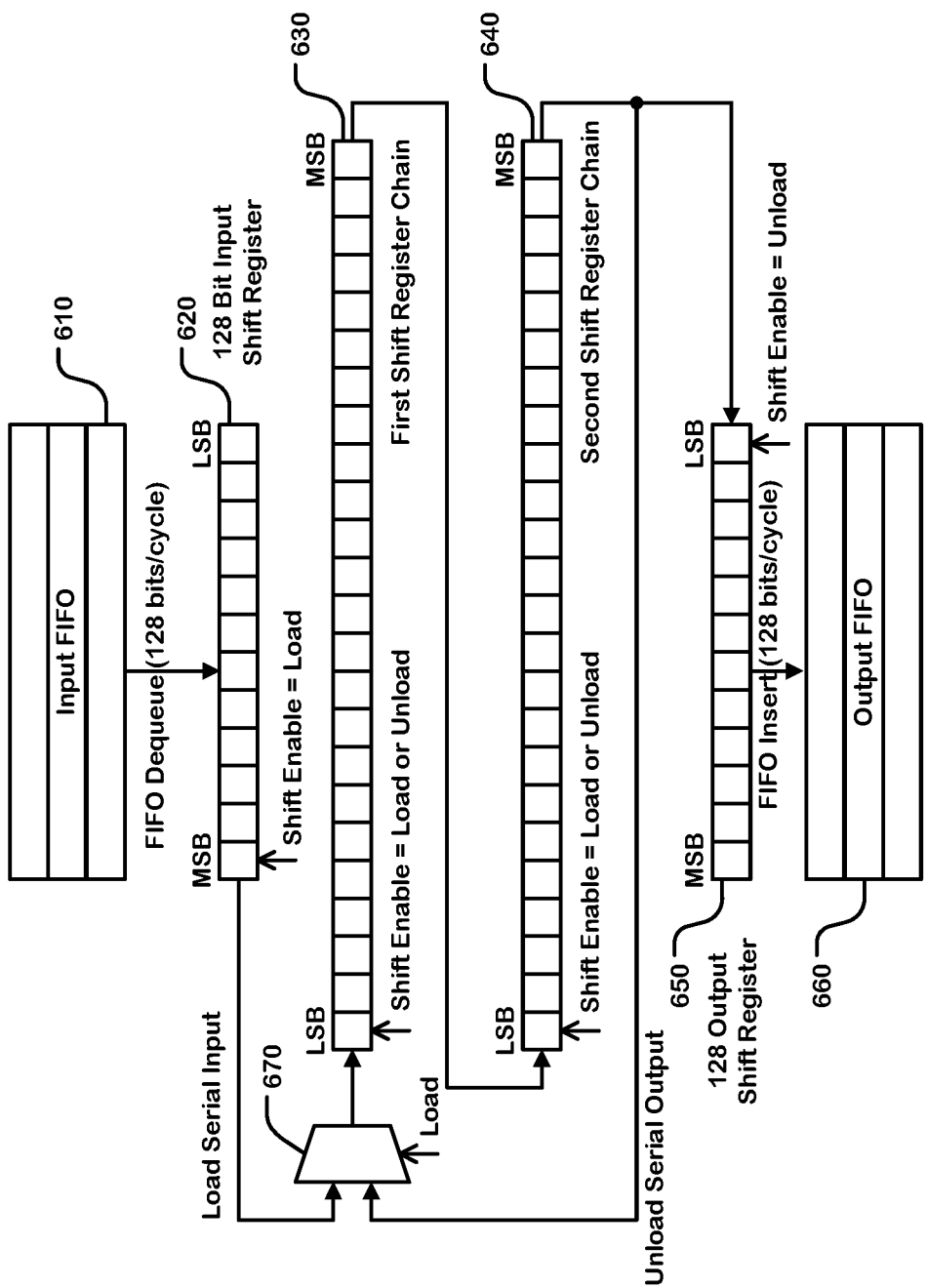
FIG. 6 is a logical representation of a structure supporting load of a configuration store in a configurable unit.

In one embodiment, in a way that can reduce the wiring requirements within a configurable unit, configuration and status registers holding unit files to be loaded in a configuration load process, or unloaded in a configuration unload process in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits. An example shift register structure is shown in FIG. 6.

The configurable units interface with the memory through multiple memory interfaces (150, FIG. 1). Each of the memory interfaces can be accessed using several AGCUs. Each AGCU contains a reconfigurable scalar datapath to generate requests for the off-chip memory. Each AGCU contains FIFOs (first-in-first-out buffers for organizing data) to buffer outgoing commands, data, and incoming responses from the off-chip memory.

The address generators AGs in the AGCUs can generate memory commands that are either dense or sparse. Dense requests can be used to bulk transfer contiguous off-chip memory regions, and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

FIG. 4 is a block diagram illustrating an example configurable unit 400, such as a Pattern Compute Unit (PCU). Configurable units in the array of configurable units include configuration data stores 420 (e.g. serial chains) to store unit files comprising a plurality of chunks (or sub-files of other sizes) of configuration data particular to the corresponding configurable units. Configurable units in the array of configurable units each include unit configuration load logic 440 connected to the configuration data store 420 via line 422, to execute a unit configuration load process. The unit configuration load process includes receiving via the bus system (e.g. the vector inputs), chunks of a unit file particular to the configurable unit, and loading the received chunks into the configuration data store 420 of the configurable unit. The unit configuration load process is further described in reference to FIG. 5.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series. A configuration store is further described in reference to FIG. 6.

A configurable unit can interface with the scalar, vector, and control buses using three corresponding sets of inputs and outputs (IO): scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process, and transmitting and receiving data during operation after configuration across a long pipeline between multiple PCUs. Control IOs can be used to communicate control signals such as the start or end of execution of a configurable unit. Control inputs are received by control block 470, and control outputs are provided by the control block 470.

Each vector input is buffered using a vector FIFO in a vector FIFO block 460 which can include one or more vector FIFOs. Each scalar input is buffered using a scalar FIFO 450. Using input FIFOs decouples timing between data producers and consumers, and simplifies inter-configurable-unit control logic by making it robust to input delay mismatches.

Input configuration data 410 can be provided to a vector FIFO as vector inputs, and then be transferred to the configuration data store 420. Output configuration data 430 can be unloaded from the configuration data store 420 using the vector outputs.

The CGRA uses a daisy chained completion bus to indicate when a load/unload command has been completed. The master AGCU transmits the program load and unload commands to configurable units in the array of configurable units (to transition from S0 to S1, FIG. 5) over a daisy-chained command bus. As shown in the example of FIG. 4, a daisy chained completion bus 491 and a daisy chained command bus 492 are connected to daisy chain logic 493, which communicates with the unit configuration load logic 440. The daisy chain logic 493 can include load complete status logic, as described below. The daisy chained completion bus is further described below. Other topologies for the command and completion buses are clearly possible but not described here.

A configurable unit includes multiple reconfigurable datapaths in block 480. A datapath in a configurable unit can be organized as a multi-stage (Stage 1 . . . Stage N), reconfigurable SIMD (Single Instruction, Multiple Data) pipe line. The chunks of data pushed into the configuration serial chain in a configurable unit include configuration data for each stage of each datapath in the configurable unit. The configuration serial chain in the configuration data store 420 is connected to the multiple datapaths in block 480 via lines 421.

A Pattern Memory Unit (e.g. PMU) can contain scratchpad memory coupled with a reconfigurable scalar datapath intended for address calculation, along with the bus interfaces used in the PCU. PMUs can be used to distribute on-chip memory throughout the array of reconfigurable units. In one embodiment, address calculation within the memory in the PMUs is performed on the PMU datapath, while the core computation is performed within the PCU.

Figure 5:
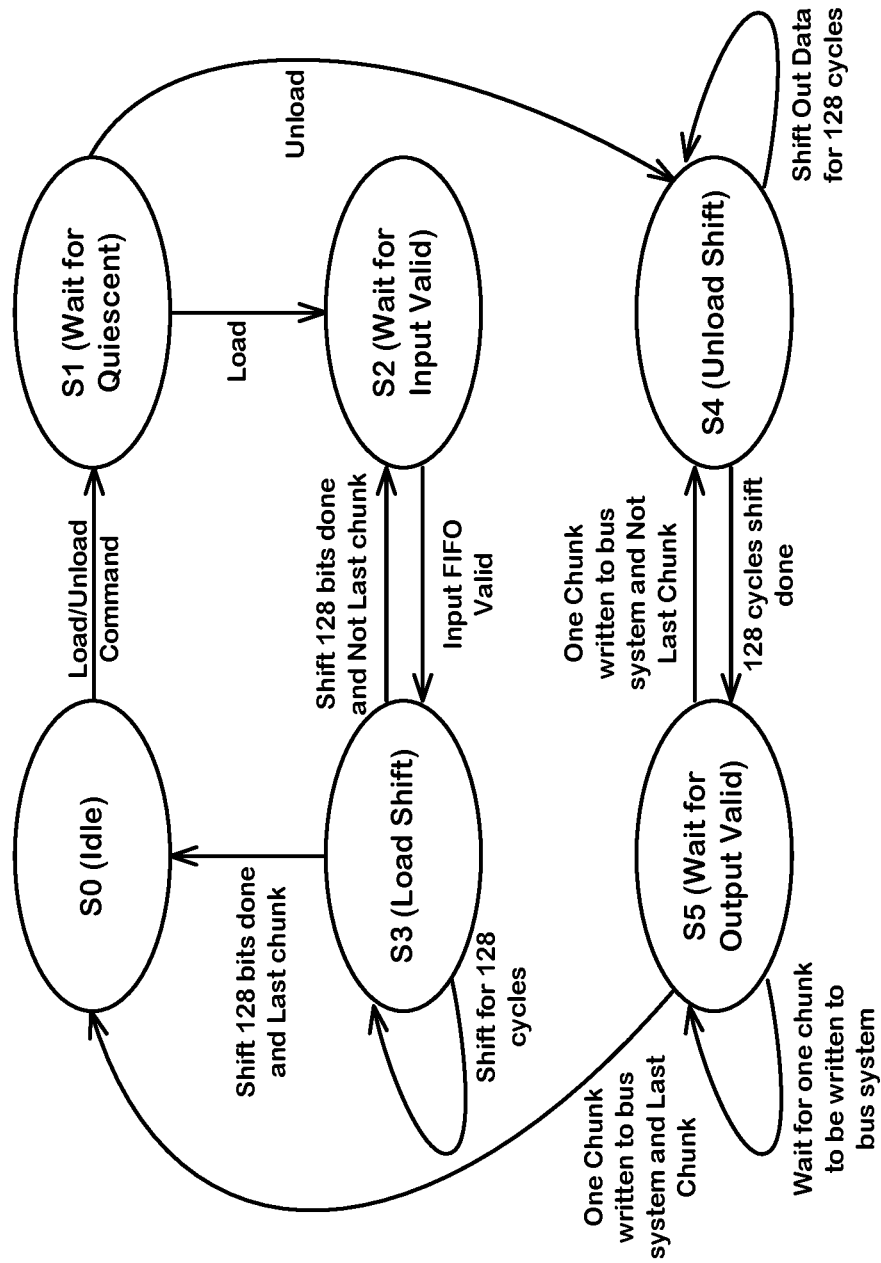
FIG. 5 illustrates one example of a state machine diagram that can be used to control a unit configuration load process in a configurable unit.

FIG. 5 illustrates one example of a state machine that can be used to control a unit configuration load process in a configurable unit. In general, a unit configuration load process receives a first chunk (or sub-file) of the unit file particular to the configurable unit from the bus system in one bus cycle, begins pushing the received first chunk into the serial chain during subsequent shifter cycles which occur at the same rate as the bus cycles, before a second chunk of the unit file is received. Upon receiving the second chunk of the unit file particular to the configurable unit from the bus system in a later bus cycle, the process begins pushing the received second chunk into the serial chain during cycles after pushing earlier received chunks into the serial chain. In some or all rounds of the configuration load process, a first chunk can be consumed by the unit configuration load process in the configurable unit before the second chunk (next in the order of chunks of the unit file) in the plurality of ordered chunks is received by the configurable unit.

The state machine of FIG. 5 includes six states S0 to S5. At State S0 (idle), the unit configuration load process waits for a configuration load/unload command from a configuration load/unload controller in a master AGCU. A configuration load/unload controller is responsible for loading and unloading of configuration data from/to the off-chip memory (140, FIG. 1) and to/from an array (190, FIG. 1) of configurable units. When a load command is received at the configuration load/unload controller, the unit configuration load process enters State S1.

At State S1 (wait for quiescent), functional flops in multiple datapaths are disabled so the functional flops are not cycling, and scalar outputs, vector outputs and control outputs are turned off so the outputs are not driving any loads. If a load command has been received, then the unit configuration load process enters State S2. When an unload command is received, the unit configuration load process enters State S4.

At State S2 (wait for input valid), the unit configuration load process waits for an input FIFO (610, FIG. 6) to become valid. When the input FIFO becomes valid, the input FIFO has received a chunk of configuration data of the configuration file via the bus system. For instance, a chunk of configuration data can include 128 bits of load data, which is received on the vector network of the bus system and the vector network has the vector bus width of 128 bits. When the input FIFO becomes valid, the unit configuration load process enters State S3.

At State S3 (load shift), a chunk of configuration data of 128 bits is first de-queued in one clock cycle from the input FIFO, and then the chunk of configuration data of 128 bits is shifted into an input shift register (620, FIG. 6) in 128 clock cycles. The input shift register can have the same length (e.g. 128 bits) as a chunk of configuration data, and it takes the same number of shifter clock cycles (e.g. 128) to shift the chunk of configuration data into the input shift register as the length of the chunk of configuration data. As mentioned above, the shifter clock and the bus clock (or bus cycles) can run at the same rate in some embodiments.

A configuration data store in a configurable unit comprises a configuration serial chain (630, 640, FIG. 6), which can be configured as a FIFO chain, to store a unit file comprising a plurality of chunks of configuration data particular to the configurable unit. The plurality of chunks of configuration data includes a first chunk of configuration data and a last chunk of configuration data. A chunk of configuration data in the input shift register is further serially shifted into the configuration data store in subsequent clock cycles. A configuration data store is further described in reference to FIG. 6.

After a first chunk of the unit file particular to the configurable unit is shifted into the input shift register at State S3, the unit configuration load process determines whether the first chunk of configuration data is the last chunk of configuration data particular to the configurable unit. If so, loading of the unit file for the configurable unit is complete, and the unit configuration load process enters State S0. If not, the unit configuration load process enters State S2, and waits for the input FIFO to become valid for a second chunk of configuration data particular to the configurable unit.

When an unload command is received in State S1, the unit configuration load process enters State S4.

At State S4 (unload shift), a chunk of configuration data from the configuration data store is shifted into an output shift register (650, FIG. 6). A chunk of configuration data can include 128 bits of unload data. The output shift register can have the same length (e.g. 128) as a chunk of configuration data, and it takes the same number of shifter clock cycles (e.g. 128) to shift the chunk of configuration data from the configuration data store into the output FIFO as the length of the chunk of configuration data. When the chunk of configuration data is shifted into the output shift register, the unit configuration load process enters State S5 (wait for output valid).

At State S5 (wait for output valid), the unit configuration load process waits for an output FIFO (660, FIG. 6) to become valid. When the output FIFO becomes valid, the chunk of configuration data having 128 bits from the output shift register is inserted into the output FIFO in one clock cycle. The chunk of configuration data in the output FIFO can then be sent to the bus system (FIG. 3).

After a first chunk of configuration data is shifted into the output FIFO at State S5, the unit configuration load process determines whether the first chunk of configuration data is the last chunk of configuration data in the configuration data store. If so, unloading of configuration data for the configurable unit is complete, and the unit configuration load process enters State S0. If not, the unit configuration load process enters State S4, and a second chunk of configuration data from the configuration data store is serially shifted into the output shift register.

FIG. 6 is a logical representation of a configuration store in a configurable unit. A configuration data store (420, FIG. 4) in a configurable unit comprises a configuration serial chain in this embodiment, including a first shift register chain 630 and a second shift register chain 640. The first shift register chain 630 includes a set of registers or latches. The second shift register chain 640 includes another set of registers or latches (flip-flops). The first shift register chain and the second shift register chain are connected in series to form a single chain in this embodiment.

A configuration file includes a plurality of chunks of configuration data for each configurable unit in a plurality of configurable units in an array of configurable units. The chunks of configuration data represent the initial configuration, or starting state, of respective configurable units. A configuration load operation in this system is the process of setting up the unit files of configuration data in an array of configurable units to allow all the configurable units to execute a program.

The set of registers in the first shift register chain 630 can represent either the setup or the sequence to run a program, including a definition of the operation of the configurable units containing the registers. These registers can register the number of nested loops, the limits of each loop iterator, the instructions to be executed for each stage, the source of the operands, and the network parameters for the input and output interfaces. The set of registers in the second shift register chain can contain data about cycle-by-cycle running state of a program loaded in a configurable unit.

As shown in the example of FIG. 6, the first shift register chain 630 and the second shift register chain 640 are connected in series, so that the MSB (most significant bit) of the first shift register chain is connected to the LSB (least significant bit) of the second shift register chain. A load signal or an unload signal can act as a shift enable signal coupled to the LSB of the first shift register chain and the LSB of the second shift register chain, to control a load/unload operation on the first shift register chain and the second shift register chain. Input FIFO 610 is coupled to the input shift register 620 via a selector 670. The selector 670 connects the input shift register 620 to the input of the configuration data store (LSB of the first shift register chain 630), when the load signal is active.

When a load signal is active, configuration data in the input shift register 620 can be shifted into the first shift register chain 630 and the second shift register chain 640 in the configuration serial chain. Here the load signal can act as an enable signal for the input shift register, the first shift register chain, and the second shift register chain. The load operation can repeat until all chunks of configuration data for a configurable unit are loaded into the configuration data store in the configurable unit. When the length of the serial chain is different than the length of an integer number of chunks (or sub-files), the first chunk in the series can be padded with the difference, and the pad bits will be shifted out to the end of the chain when the last chunk is shifted in. For example, a configuration data store in a configurable unit can store a unit file having a size of 760 bits. The unit configuration load process can load an integer number N of chunks. In this example, N=6, and the number N of chunks include Chunk 5, Chunk 4, Chunk 3, Chunk 2, Chunk 1 and Chunk 0. A vector bus has a vector width of 128 bits, a chunk of configuration data has 128 bits, and a chunk can be sent to a configurable unit in one bus clock cycle. The N chunks have a size of N×128=6*128=768 bits, which includes 8 pad bits to match the unit file size of 760 bits.

In order to recover from errors, an unload operation can checkpoint the state of each configurable unit. The unload operation can save the execution state of each configurable unit that is needed for restart, and enable the application to be restarted if an error occurs. It also allows the state of configurable units to be saved or transferred for debug purposes. The state that needs to be saved includes at least the contents of part the first or second shift registers, and optionally contents of the PMU memories. Program unload may also require unloading the state of all of the first and second shift registers.

Output FIFO 660 is coupled to the output shift register 650, which in turn is coupled to the output of the configuration data store (MSB of the second shift register chain 640). For an unload operation, when an unload signal is active, the configuration data in the second shift register chain 640 and the first shift register chain 630 can be shifted into the output shift register 650. When the output FIFO 660 is valid, the configuration data (e.g. 128 bits) in the output shift register 650 can be inserted into the output FIFO 660 in one clock cycle. The unload operation can repeat until all chunks of configuration data in a configuration data store in a configurable unit are unloaded into the output FIFO.

In order to synchronize and communicate the completion of configuration load commands issued by the configuration load controller in a MAGCU, a single wire daisy chained scheme is implemented in one example, supported by logic included in daisy chain logic (e.g., daisy chain logic 493 in FIG. 4) in each component of the chain. This scheme requires every component to have the following 2 ports:

1. Input port called PROGRAM_LOAD_DONE_IN
2. Output port called PROGRAM_LOAD_DONE_OUT A component will drive its PROGRAM_LOAD_DONE_OUT signal when it has completed executing the command issued by MAGCU and its PROGRAM_LOAD_DONE_IN input is driven high. MAGCU will initiate the daisy chain by driving its PROGRAM_LOAD_DONE_OUT when it has completed all necessary steps for executing a command. The last component in the chain will drive its PROGRAM_LOAD_DONE_OUT which will be connected to PROGRAM_LOAD_DONE_IN of MAGCU. PROGRAM_LOAD_DONE_IN of MAGCU going high indicates the completion of a command. After delivering the data corresponding to all CHUNKS of all components, MAGCU drives its PROGRAM_LOAD_DONE_OUT port high. All components will drive their respective PROGRAM_LOAD_DONE_OUT ports high when they have completed loading all their configuration bits.

When MAGCUs input port PROGRAM_LOAD_DONE_IN is asserted, the configuration file load is complete.

Figure 7:
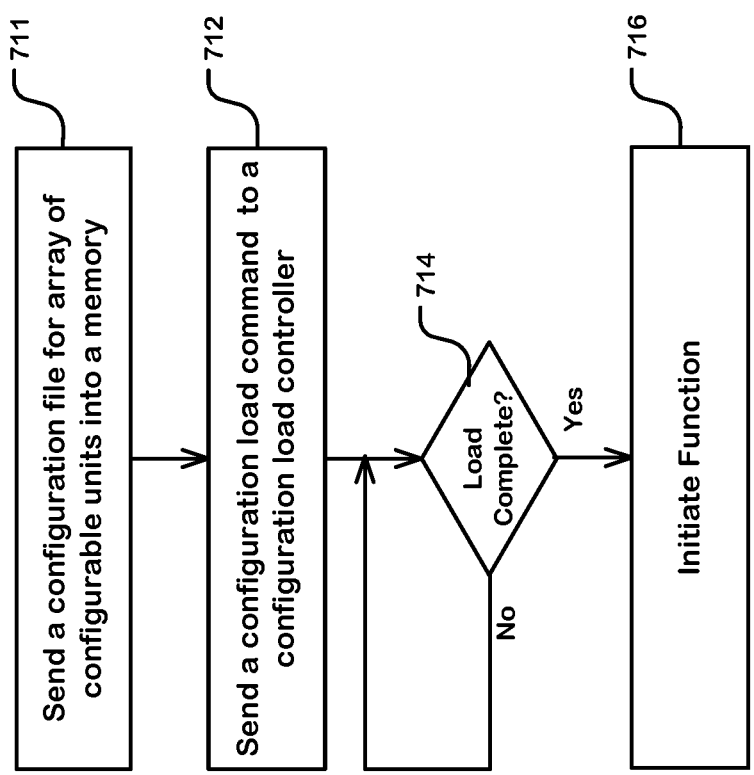
FIG. 7 is a flowchart illustrating operations of a host coupled to a reconfigurable data processor.

FIG. 7 is a flowchart illustrating operations of a host coupled to a reconfigurable data processor. At Step 711, a host (120, FIG. 1) sends a configuration file for an array of configurable units to an off-chip memory (140, FIG. 1) via a PCIE interface (130, FIG. 1) and a top level network (115, FIG. 1), or otherwise stores the configuration file in memory accessible to the configurable processor.

At Step 712, when loading the configuration file to the memory is completed, the host 120 sends a configuration load command to a configuration load controller in the processor (part of a master AGCU in this example). The master AGCU can implement a register through which the host can send a configuration load command to the configuration load controller. The configuration load command can identify a location in memory accessible via a memory interface on the configurable processor. The configuration load controller can then generate one or more memory access requests via the top level network in response to the command to retrieve the configuration file. The host can then monitor the configurable processor for a signal that the configuration file has been completely loaded (714). When the file loading is complete, then the host can initiate the function to be executed by the machine (716).

Figure 8:
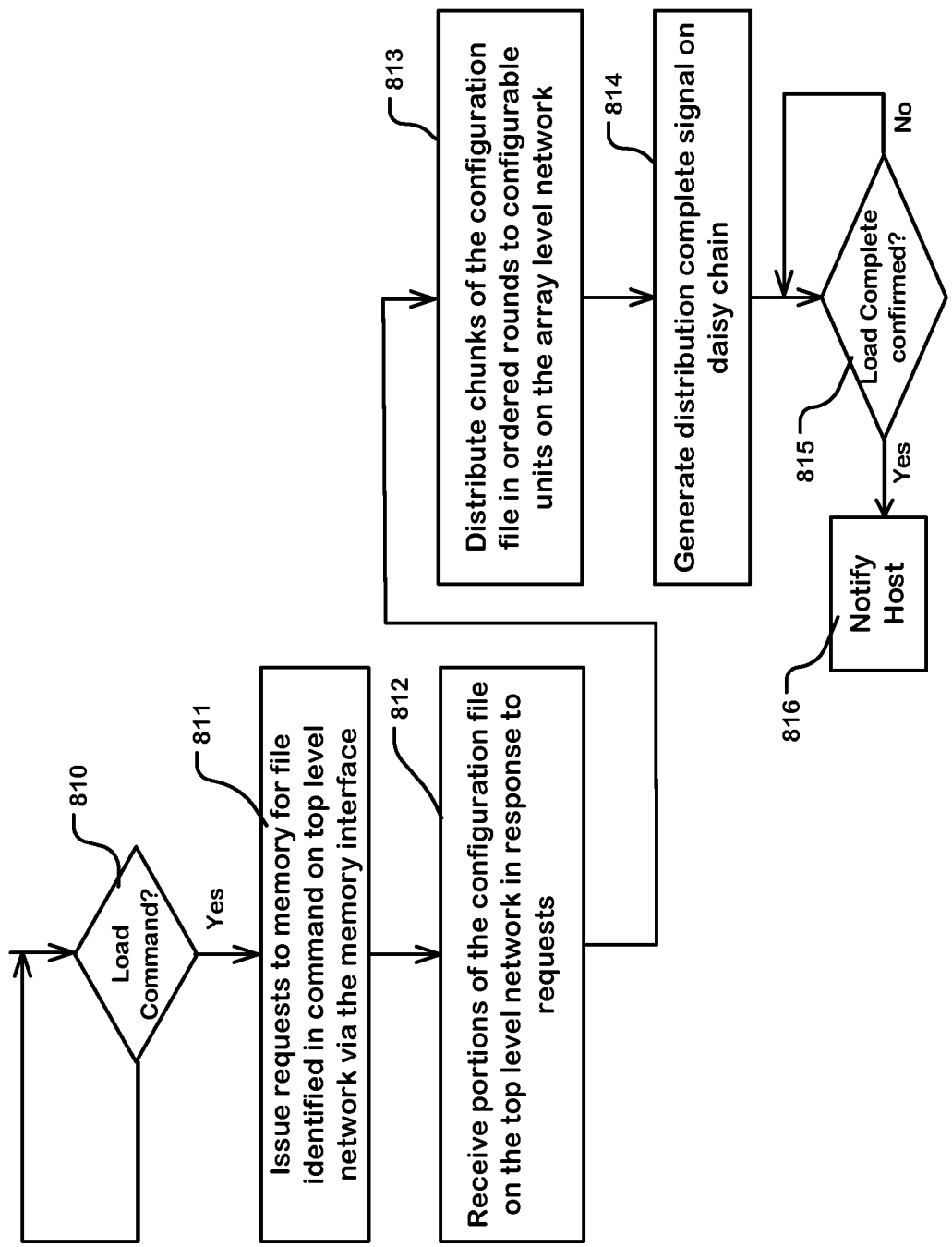
FIG. 8 is a flowchart illustrating operations of the configuration load controller, which can be part of a master AGCU or otherwise in communication with the array of configurable units in a tile.

FIG. 8 is a flowchart illustrating operations of the configuration load controller, which can be part of a MAGCU or otherwise in communication with the array of configurable units in a tile. The configuration load controller is responsible for reading the configuration file from the off-chip memory (140, FIG. 1) and sending the configuration data to every configurable unit in an array of configurable units. This flow chart begins with the configuration load controller waiting for a configuration load command (810). As mentioned above, the configuration load command identifies a configuration file, and its location in memory accessible to the processor.

Upon receiving a load command, at Step 811, the configuration load controller issues load requests to the memory (140, FIG. 1) connected to the reconfigurable data processor (110, FIG. 1). At Step 812, the configuration load controller retrieves chunks of the configuration file on the top level network via the memory interface. At Step 813, the configuration load controller distributes chunks of the configuration file in ordered rounds to the configurable units in the array on the array level network. When all the chunks of the configuration file have been received and distributed, the configuration load controller generates a distribution complete signal (e.g. its PROGRAM_LOAD_DONE_OUT) at step 814. The configuration load controller then waits for confirmation from the configurable units that their respective unit files have been loaded, indicated for example by assertion of its PROGRAM_LOAD_DONE_IN at step 815. Upon confirmation of successful configuration load, the configuration load controller can notify the host (816).

FIG. 9 illustrates one example organization of a configuration file. Other organizations can be used as well arranged as suits a particular protocol for loading and unloading configuration files. In the example described with reference to FIG. 9, configurable units in an array of configurable units include the Switch, PCU, PMU, and AGCU. Each of these configurable units contains a set of registers that represent either the setup or the sequence to run a program. These registers include data to define the operation of the configurable unit containing it, such as the number of nested loops, the limits of each loop iterator, the instructions to be executed for each stage, the source of the operands, and the network parameters for the input and output interfaces. Additionally, each the configuration files can include data to set context in a set of counters that track its progress in each nested loop.

A program executable contains a bit-stream representing the initial configuration, or starting state, of each of the configurable units that execute the program. This bit-stream is referred to as a bit file, or herein as a configuration file. Program load is the process of setting up the configuration stores in the configurable units based on the contents of the configuration file to allow all the configurable units to execute a program. Program unload is the process of unloading the configuration stores from the configurable units, and assembling a bit-stream, called herein an unload configuration file. The unload configuration file has, in examples described herein, the same arrangement chunks or sub-files and the configuration file used for program load.

The configuration file includes a plurality of chunks of configuration data for each configurable unit in an array of configurable units, the chunks being arranged in the configuration file in a fashion that matches the sequence in which they are to be distributed. This organization of the configuration file enables the array configuration load process to route the chunks to configurable units based on locations of the chunks in the configuration file.

As illustrated in FIG. 9, the configuration file (and the unload configuration file arranged in the same manner) includes a plurality of chunks of unit files for each configurable unit in a plurality of configurable units, the unit files having up to M (Z4=6 in this example) sub-files having an order (i) in the unit file. In FIG. 9, M is six, and the chunks are ordered from first to sixth (i.e. the first through the sixth chunks correspond with chunks (0) to (5) in this indexing). The chunks are arranged so that all sub-files of order (i) for (i) going from 0 to M−1, for all the unit files in the load or unload configuration file are stored in a corresponding block (i) of address space in the memory, for (i) going from 0 to M−1. The chunks of order (0) are stored in block (0) including addresses A0 to A1−1. The chunks of order (0) for switch units in this example are in a group of contiguous addresses within block (0). The chunks of order (0) for PCUs are in a group of contiguous addresses within block (0). The chunks of order (0) for PMUs are in a group of contiguous addresses within block (0). The chunks of order (0) for AGCUs are in a group of contiguous addresses. The chunks of order (1) are stored in block (1) including addresses A1 to A2−1. The chunks of order (1) for switch units in this example are stored in a group of contiguous addresses within block (1). The chunks of order (1) for PCUs are in group of contiguous addresses within block (1). The chunks of order (1) for PMUs are in group of contiguous addresses within block (1). The chunks of order (1) for AGCUs are in group of contiguous addresses within block (1). The chunks of orders 3 to 5 are arranged as seen in FIG. 9, following the pattern in blocks (2) to (5).

As seen, the linear address space is allocated within the blocks for a configuration file on line boundaries in this example. In other embodiments, the linear address space can be allocated on word boundaries or chunk boundaries. The boundaries can be chosen to match efficiency characteristics of the memory be used. Thus, the configuration file in this example comprises lines of the memory with sequential line addresses.

Also, the array includes more than one type of configurable unit, and the unit files for different types of configurable units include different numbers of sub-files of configuration data, and wherein within a block (i) of address space, the sub-files for each type of configurable unit are stored in a corresponding group of contiguous addresses within the block (i) of address space.

The array can include more than one type of configurable unit, and the unit files for different types of configurable units can include different numbers of chunks of configuration data. For instance, as shown in FIG. 3, types of configurable units in the array can include Switch Units, PCU (Pattern Compute Units), PMU (Pattern Memory Units) and AGCU (Address Generation and Coalescing Units).

An example configuration file organization includes:

W (e.g., 28 in FIG. 3) Switch units, each unit requiring Z1 chunks of configuration bits;

X (e.g., 9) PCU units, each unit requiring Z2 chunks of configuration bits;

Y (e.g., 9) PMU units, each unit requiring Z3 chunks of configuration bits;

Z (e.g., 4) AGCU units, each unit requiring Z4 chunks of configuration bits.

Thus, the unit files for a first type of configurable unit can include Z1 chunks, and the unit files for a second type of configurable unit include Z2 chunks, where Z1 is less than Z2. The array configuration load process can include retrieving segments of the configuration file including chunk (i) of the unit files for all of the configurable units of the first type and the second type, in Z1 rounds for (i) going from 0 to Z1−1, and then retrieving segments of the configuration file including chunk (i) of the unit files for all of the configurable units of the second type, in Z2 rounds for (i) going from Z1 to Z2−1. The unit files for a third type of configurable unit can include Z3 chunks, and the unit files for a fourth type of configurable unit include Z4 chunks, where Z1 is less than Z2, Z2 is less than Z3, and Z3 is less than Z4. The distribution sequence can continue in this mode with one round for each chunk (i) for all the different types of configurable units that require more than (i+1) chunks.

As shown in the example configuration file organization, chunks of configuration data in a configuration file are arranged in an interleaved fashion:

the first of 2 chunks of configuration bits for each of the switch units for round R(i=0);
the first of 3 chunks of configuration bits for each of the PCU units for round R(i=0);
the first of 5 chunks of configuration bits for each of the PMU units for round R(i=0);
the first of 6 chunks of configuration bits for each of the AGCU units for round R(i=0);
the second of 2 chunks of configuration bits for each of the switch units for round R(i=1);
the second of 3 chunks of configuration bits for each of the PCU units for round R(i=1);
the second of 5 chunks of configuration bits for each of the PMU units for round R(i=1);
the second of 6 chunks of configuration bits for each of the AGCU units for round R(i=1);
the third of 3 chunks of configuration bits for each of the PCU units for round R(i=2);
the third of 5 chunks of configuration bits for each of the PMU units for round R(i=2);
the third of 6 chunks of configuration bits for each of the AGCU units for round R(i=2);
the fourth of 5 chunks of configuration bits for each of the PMU units for round R(i=3);
the fourth of 6 chunks of configuration bits for each of the AGCU units for round R(i=3);
the fifth of 5 chunks of configuration bits for each of the PMU units for round R(i=3);
the fifth of 6 chunks of configuration bits for each of the AGCU units for round R(i=4);
the sixth of 6 chunks of configuration bits for each of the 4 AGCU units for round R(i=5).

The unit files can be organized to comprise a plurality of ordered chunks (or other sized sub-files). The unit files particular to different configurable units may have different numbers of ordered chunks in some embodiments. The configuration file for an array of configurable units is arranged so that chunks of the unit files are grouped with chunks of the same order for other unit files. Also, the configuration file is arranged so that location of a chunk in the configuration file implies the configurable unit in the array of the chunk and its order in the unit file particular to the configurable unit.

The array configuration load process can retrieve segments of the configuration file including chunk (i) of the unit files for all of the configurable units of the first type (Switch type), the second type (PCU type), the third type (PMU type) and the fourth type (AGCU type), for (i) going from 0 to Z1−1(=1). The chunks (0) of the unit files for all of the configurable units of the four types are retrieved in a first round, and the chunks (1) of the unit files for all of the configurable units of the four types are retrieved in a second round. After the first and second rounds, all (2) chunks of the unit files for all of the configurable units of the first type (Switch type) have been retrieved. The unit files for all of the configurable units of the first, second, third and fourth types have 0, 1, 3 and 4 chunks remaining to be retrieved, respectively.

The array configuration load process can then retrieve segments of the configuration file including chunk (i) of the unit files for all of the configurable units of the second, third and fourth types in a third round. After the third round, all (3) chunks of the unit files for all of the configurable units of the second type (PCU type) have been retrieved. The unit files for all of the configurable units of the first, second, third and fourth types have 0, 0, 2 and 3 chunks remaining to be retrieved, respectively.

The array configuration load process can then retrieve segments of the configuration file including chunk (i) of the unit files for all of the configurable units of the third and fourth types in a fourth round. After the fourth round, all (4) chunks of the unit files for all of the configurable units of the third type (PMU type) have been retrieved. The unit files for all of the configurable units of the first, second, third and fourth types have 0, 0, 1 and 2 chunks remaining to be retrieved, respectively.

The array configuration load process can then retrieve segments of the configuration file including chunk (i) of the unit files for all of the configurable units of the third and fourth types, for (i) going from Z3(=4) to Z4−1(5), in fifth and sixth rounds. After the sixth round, all (6) chunks of the unit files for all of the configurable units of the fourth type (AGCU type) have been retrieved. The unit files for all of the configurable units of the first, second, third and fourth types have 0, 0, 0 and 0 chunks remaining to be retrieved, respectively.

In the manner described above, the array configuration load process can continue until the unit files for all of the configurable units of the first, second, third and fourth types have no chunks remaining to be retrieved.

The array configuration load process routes chunks of the configuration data to configurable units via the array level network using addresses implied by location of the chunks in the configuration file. For instance, the first of 2 chunks of the configuration data for each of the 198 switch units has linear memory addresses 0-12288, and the second of 2 chunks of the configuration data for each of the 198 switch units has linear memory addresses 33792-46080.

In some embodiments, the chunks of the configuration file may be returned out of order to the configuration load controller from memory. The location of the chunks in the configuration file can be used to route the chunk to the correct configurable unit. Because of the organization of the rounds in the distribution sequence, the configurable units are guaranteed to receive the chunks of their unit files in order.

Figure 10:
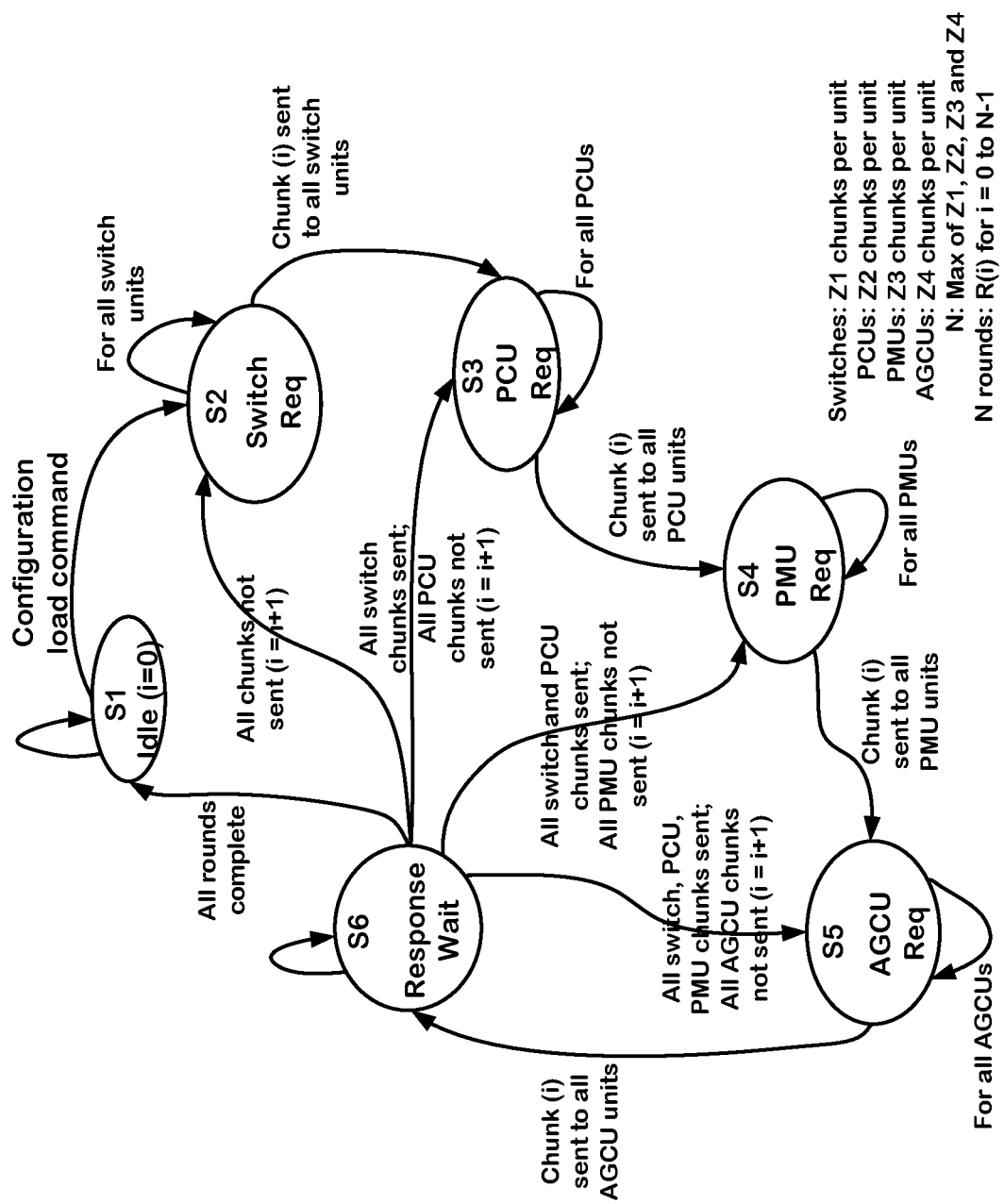
FIG. 10 is a state machine diagram illustrating one example of logic to execute an array configuration load process for a system like that of FIGS. 2 and 3.

FIG. 10 is a state machine diagram illustrating one example of logic to execute an array configuration load process for a system like that of FIGS. 2 and 3, including distributing a configuration file comprising unit files for a plurality of the configurable units in the array, the unit files each comprising a plurality of ordered chunks (or sub-files), by sending in a sequence of N rounds (R(i) for i=0 to N−1) one unit chunk of order (i) via the bus system to all of the configurable units including up to N sub-files in the plurality of configurable units, until the unit files in the configuration file are distributed to the configurable units in the plurality of configurable units.

In this example, the state machine includes six states S1 to S6. At State S1 (Idle), the configuration load controller waits for a configuration load command from the host. When a configuration load command is received, the load process enters State S2 to begin executing a first round R(0) of the distribution sequence. Each round traverses states S2 to S6. In the example described herein, there are six rounds because the maximum number of chunks to be distributed to a configurable unit in the array is six.

At State S2 (Switch Req), the configuration load controller generates memory access requests via the top level network to retrieve chunks for state S2 of round R(i) of the configuration unit files for respective switch units, and distributes the retrieved chunks to the respective switch units. For i=0, in round R(0), the configuration load controller generates memory access requests for the chunk (0) in the multiple chunks for respective switch units, and sends the chunks (0) to the respective switch units. For i=1, in round R(1), the configuration load controller generates memory access requests for chunk (1) in the multiple chunks for respective switch units, and sends the chunks to the respective switch units. In round R(i), when the configuration load controller has generated memory access requests for the chunks (i) in the multiple chunks for the respective switch units, and distributed the chunks for all the switch units, the load process enters State S3.

At State S3 (PCU Req), the configuration load controller generates memory access requests via the top level network to retrieve chunks for round R(i) of the configuration unit files for respective PCU units (Pattern Compute Units), and distributes the retrieved chunks to the respective PCU units. In state S3 of round R(i), the configuration load controller generates memory access requests for the chunks (i) in the multiple chunks for respective PCU units, and sends the chunks (i) to the respective PCU units. In round R(i), when the configuration load controller has generated memory access requests for chunk (i) in the multiple chunks for the respective PCU units and distributed the chunks, the load process enters State S4.

At State S4 (PMU Req), the configuration load controller generates memory access requests via the top level network to retrieve chunks of the configuration unit files for respective PMU units (Pattern Memory Units) in the array of configurable units, and sends the retrieved chunks to the respective PMU units. In state S4 of round R(i), the configuration load controller generates memory access requests for the chunks (i) in the multiple chunks for respective PMU units, and sends the chunks (i) to the respective PMU units. For instance, for i=0, in round R(0), the configuration load controller generates memory access requests for the chunks (0) in the multiple chunks for respective PMU units, and sends the chunks (0) to the respective PMU units. For i=1, in round R(1), the configuration load controller generates memory access requests for the chunks (1) in the multiple chunks for respective PMU units, and sends the chunks (1) to the respective PMU units. In round R(i), when the configuration load controller has generated memory access requests for the chunks (i) in the multiple chunks for the respective PMU units and distributed the chunks, the load process enters State S5.

At State S5 (AGCU Req), the configuration load controller generates memory access requests via the top level network to retrieve chunks of the configuration unit files for respective AGCUs (Address Generation and Coalescing Units) in the array of configurable units, and sends the retrieved chunks to the respective AGCU units. In State S5 of round R(i), the configuration load controller generates memory access requests for the chunks (i) in the multiple chunks for respective AGCU units, and sends the chunks (i) to the respective AGCU units. In state S5 of round R(i), when the configuration load controller has generated memory access requests for the chunks (i) in the multiple chunks for the respective AGCU units and distributed the chunks, the load process enters State S6 of round R(i).

At State S6 (Response Wait), the configuration load controller waits to ensure that configurable units (switch, PCU, PMU, AGCU units) in the array are ready to receive more chunks of configuration data in a next round. If all chunks for the switch units are not sent, the load process increments (i) and proceeds to State S2 to start the next round R(i+1). If all chunks for the switch units are sent but all chunks for the PCU chunks are not sent, the load process increments (i) and proceeds to State S3 to start the next round R(i+1). If all chunks for the switch units and the PCU units are sent but all chunks for the PMU chunks are not sent, the load process increments (i) and proceeds to State S4 to start the next round R(i+1). If all chunks for the switch units, the PCU units, and the PMU units are sent but all chunks for the AGCU chunks are not sent, the load process increments (i) and proceeds to State S5 to start the next round R(i+1). If all chunks for all configurable units (switch, PCU, PMU, AGCU units) are sent (i.e., all rounds complete), the load process proceeds to State S1.

Figure 11:
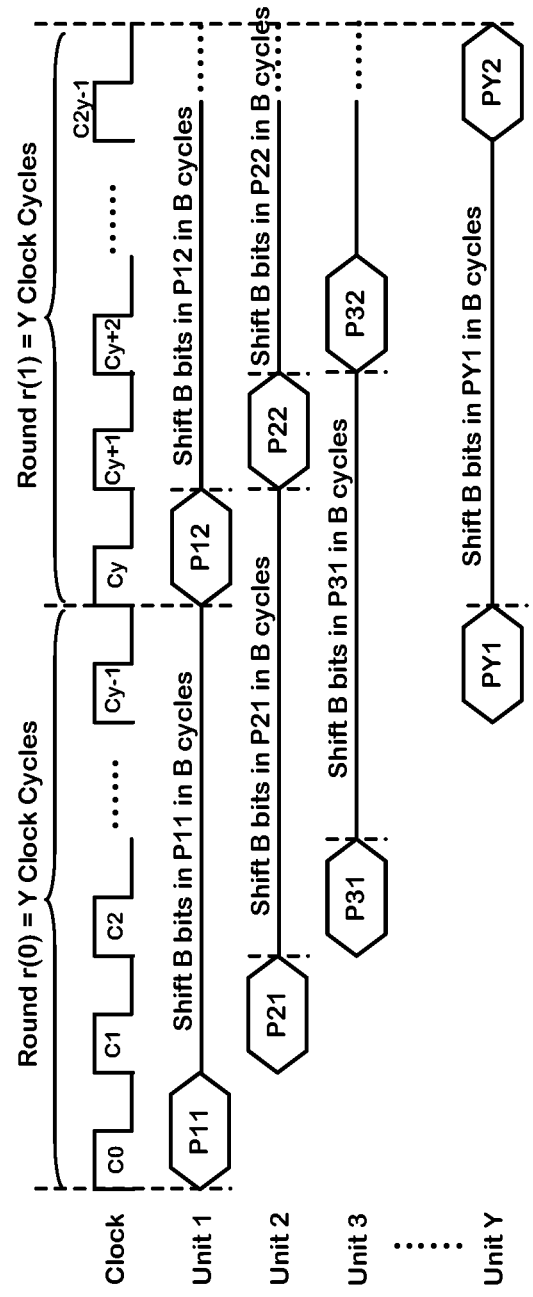
FIG. 11 is a timing diagram illustrating a timing of early rounds of a distribution sequence like that of FIG. 10.

FIG. 11 is a timing diagram illustrating a timing of early rounds of a distribution sequence like that of FIG. 10. In this example, a chunk of the configuration unit file has a number B of bits of data (e.g. B=128), a round in the distribution sequence can include a number X of configurable units, an array of configurable units can include a number Y of configurable units (e.g. Y=148). For round R(0), X can be equal to Y. In subsequent rounds, X can be less than or equal to Y.

In this example, round R(0) includes Y=148 configurable units. For rounds R(0) and R(1), X=Y. After the first two rounds R(0) and R(1), the switch units have received all (2) their chunks, so the third round R(2) includes fewer than 128 configurable units.

As shown in the example of FIG. 11, round R(0), a first chunk P11 of the configuration unit file is received at a configurable unit via the bus system in a first bus cycle C0. The first chunk is then loaded into the configuration store of a first configurable unit "Unit 1", by serially shifting in a parallel task at the configurable unit while other chunks of the round are distributed by the configuration load controller to other configurable units, B bits of data in the first chunk P11 in B clock cycles (which can run at the same rate as the bus clock). A second chunk P21 of the configuration file is received via the bus system in a second bus cycle C1. The second chunk is then loaded in a parallel task into the configuration store of a second configurable unit "Unit 2", by serially shifting B bits of data in the second chunk P21 in B clock cycles. A third chunk P31 of the configuration file is received via the bus system in a third bus cycle C2. The third chunk P31 is then loaded into the configuration store of a third configurable unit "Unit 3", by serially shifting B bits of data in the third chunk P31 in B clock cycles. This round proceeds until all the configurable units receive the first chunk of the unit file particular to them.

Round R(0) includes distributing a first set of Y chunks of the configuration file (P11, P21, P31 . . . PY1) in the Y respective configurable units (Unit 1 . . . Unit Y) in the array. A chunk of the configuration file has a number B of bits of data, and the array of configurable units has the number Y of configurable units. When round R(0) is completed, Y chunks of the configuration file (P11, P21, P31 . . . PY1) in the first set have been received in Y configurable units in the array in Y bus cycles (C0 to CY−1), and the first chunk P11 has been loaded or serially shifted into the configuration store of the first configurable unit "Unit 1" in B clock cycles. The B clock cycles are subsequent to the first clock cycle C0 in which the first chunk P11 is received.

The next round R(1) includes receiving a second set of Y chunks of the configuration file (P12, P22, P32 . . . Py2) in the Y respective configurable units in the array (Unit 1 . . . Unit Y). When round R(1) is completed, Y chunks of the configuration file (P12, P22, P32 Py2) in the second set have been received in the Y respective configurable units in the array in Y clock cycles (Cy to C2y−1). When round R(1) is completed, the second chunk P12 for the first configurable unit "Unit 1" has been loaded or serially shifted into the configuration store of the first configurable unit "Unit 1" in B clock cycles subsequent to the first clock cycle (Cy) in round R(1). Also when the second round is completed, the last chunk PY1 in the first set of Y chunks of the configuration file received in round R(0) has been loaded or serially shifted into the configuration store of the last configurable unit "Unit Y".

As long as the number B (128) of bits in a chunk is less than the number X of configurable units in a round, the configurable unit will receive a next chunk of a unit configuration file after the previous chunk has been loaded so that the configurable units should be ready without requiring the sequence to stall. In this example, the number B of bits in a chunk is 128, and the number X of configurable units in round R(0) is X=Y=148. Since it takes 128 clock cycles to serially shift the 128 bits in a chunk into the configuration data store of a configurable unit, there can be effectively 20 (Y−B=148−128) buffer cycles after the shifting is done, ensuring that the first configurable unit "Unit 1" is ready to accept the next chunk (P12) in the next round R(1). When the number B of bits in a chunk is greater than the number X of configurable units in a round, a next chunk can be received while a previous chunk is being consumed. Here being consumed refers to serially shifting bits in a chunk into the configuration data store of a configurable unit.

Generally, the unit configuration load process receives a first chunk (or sub-file) of the unit file particular to the configurable unit from the bus system in one bus cycle, begins pushing the received first chunk into the serial chain during subsequent bus cycles before a second chunk of the unit file for a next round is received, receives the second chunk of the unit file particular to the configurable unit from the bus system for the next round of the sequence in a later bus cycle, and begins pushing the received second chunk into the serial chain during cycles of the sequence after pushing earlier received chunk into the serial chain. In some rounds, all of a received chunk can be consumed before the next chunk is received.

Since different types of configurable units may have a different number of configuration bits, the configurable units may require varying number of chunks. Once configurable units which require a fewer number of chunks have loaded all of their configuration bits, the configuration load controller stops sending data to them. This can result in fewer configurable units (the number X) interleaved and can lead to configurable units receiving new chunks before they are done processing the previous chunk. This can lead to back-pressure on the array level network.

The back-pressure can be handled via a credit mechanism on the array level network. For instance, each input FIFO can have a hop-to-hop credit, so if a PCU's input FIFO fills up, then no switch in the array level network trying to send configuration data to that PCU's input FIFO can send data until the input FIFO empties one entry and returns a credit to the sending switch. Eventually, the back-pressure may stall the AGCU from sending data as links are busied. But, once the configurable unit consumes all 128 bits of a chunk, it empties one input FIFO entry, a credit is released, and then the sender can send a new chunk if available.

Figure 12:
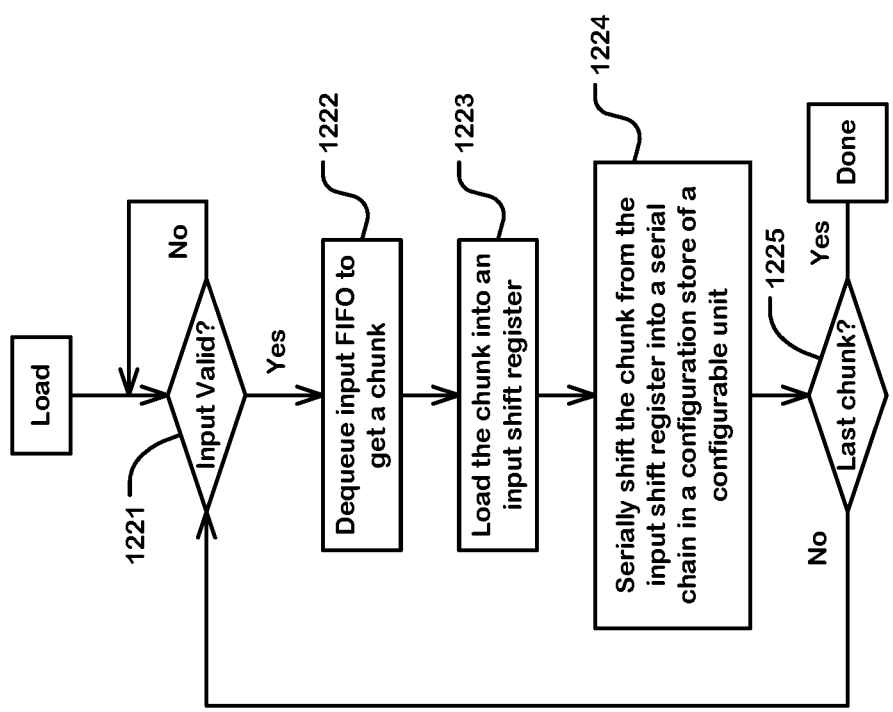
FIG. 12 is a flowchart illustrating a unit configuration load process in a configurable unit.

FIG. 12 is a flowchart illustrating a unit configuration load process in a configurable unit. At Step 1221, a unit configuration load process waits for an input FIFO (610, FIG. 6) to become valid. When valid, the input FIFO has received a chunk of configuration data of the configuration file via the bus system for configuring the configurable unit. When the input FIFO is valid, the flow proceeds to Step 1222.

At Step 1222, the input FIFO is de-queued. At Step 1223, the chunk of configuration data from the input FIFO is loaded in parallel into an input shift register (620, FIG. 6). At Step 1224, a chunk of configuration data in the input shift register is shifted into a configuration serial chain in a configuration data store of the configurable unit.

At Step 1225, the unit configuration load process determines whether the loaded chunk of configuration data is the last chunk of configuration data for the configurable unit. If so, loading of configuration data for the configurable unit is complete. If not, the flow proceeds to Step 1221, and the unit configuration load process waits for the input FIFO to become valid for a next chunk of configuration data. A unit configuration load process in a configurable unit is further described in reference to FIGS. 5 and 6.

Figure 13:
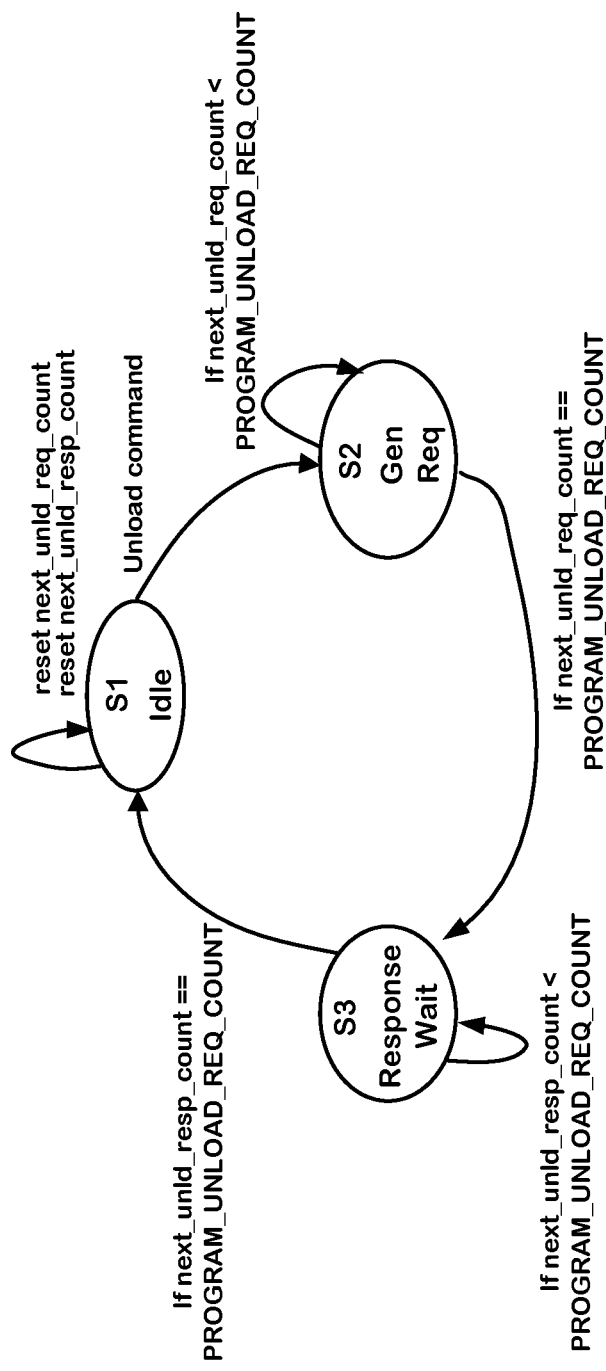
FIG. 13 is a state machine diagram illustrating one example of logic to execute an array configuration unload process for a system like that of FIGS. 2 and 3.

FIG. 13 is a state machine diagram for one example of logic to execute an array configuration unload process for a system like that of FIGS. 2 and 3.

In this example, the state machine includes three states S1 to S3. At State S1 (Idle), the configuration unload controller waits for a configuration unload command from the host. The configuration unload controller implements two counts "next_unld_req_count" and "next_unld_resp_count" for the array configuration unload process. The count "next_unld_req_count" keeps track of the next unload request count. The count "next_unld_resp_count" keeps track of the next unload response count. At State S1, both counts are reset to an initial value, such as 0. When a configuration unload command is received, the unload process enters State S2.

At State S2 (Gen Req), the configuration unload controller generates unload requests for each of the configurable units in the array of configurable units, including the switch units, the PCUs, the PMUs and the AGCUs in the array. The count "next_unld_req_count" is incremented for each unload request generated. The count "next_unld_req_count" is compared against a predetermined number PROGRAM_UNLOAD_REQ_COUNT, which represents the total number of the configurable units in the array of configurable units. As long as the count "next_unld_req_count" is less than PROGRAM_UNLOAD_REQ_COUNT, the unload process stays in State S2. When the count "next_unld_ req_count" is equal to PROGRAM_UNLOAD_REQ_COUNT, the unload requests have been generated for each of the configurable units in the array, and the unload process enters State S3.

At State S3 (Response Wait), the configuration unload controller increments the count "next_unld_resp_count" for each response received from the configurable units in the array. A response includes a chunk (sub-file) in a unit file of configuration data for a configurable unit. A response can also include PMU scratchpad data in some examples. During the unload process, a response is provided to a vector output of a configurable unit and sent on a vector bus to the configuration load controller. As long as the count "next_unld_resp_count" is less than PROGRAM_UNLOAD_REQ_COUNT, the unload process stays in State S3.

At State S3, the unload process generates a memory address for each response received, and inserts each response received along with the memory address generated on the top level network. Each response includes an unload chunk and a sequence ID. A memory address is generated from headers that accompany packets carrying the chunks in the array level network, including a chunk number, a column identifier, a row identifier, and a component identifier in a sequence ID. A component identifier can indicate whether a configurable unit is a switch unit, a PCU unit, a PMU unit or an AGCU unit. A sequence ID is further described in reference to FIG. 3.

When the count "next_unld_resp_count" is equal to PROGRAM_UNLOAD_REQ_COUNT, the responses have been received from each of the configurable units in the array and inserted on the top level network, and the unload process transitions back to State S1.

In one embodiment, the order for the linear memory address for configuration data in switch units is the first chunks of each row in the first column of switch units, followed by the first chunks of each row in the second column of switch units, followed by the first chunks of each row in the third column of switch units, . . . until the first chunks of each row in the last column. This groups the first chunk of all switch units in linear address space. The first chunks for other types of configurable units are loaded in groups in adjacent address space. Then, the order is followed by the second chunks of each row in the first column of switch units, followed by the second chunks of each row in the second column of switch unites, followed by the second chunks of each row in the third column, . . . until the last chunk in the last row in the last column of switch units, and so on for the second chunks of all the types of configurable units.

Using the order for the memory address for configuration data in switch units as described above, pseudo code below illustrates how to generate a linear memory address for a switch unit (comp_switch). The pseudo code uses 4 inputs:

comp_id: a component identifier;

comp_col: a column identifier;

comp_row: a row identifier;

comp_chunk: a chunk number;

and produces an output:

linear_address: the linear memory address for an unload chunk;

The pseudo code for generating a linear memory address for a particular unload chunk of a switch unit is as follows:

```
If (comp_id==comp_switch) begin
    comp_num = comp_col*NUM_ROW_SW + comp_row;
    linear_comp_num = comp_num + (comp_chunk *
        COMP_COUNT_ALL);
    linear_address = linear_comp_num * 16;
    end
where
    comp_switch indicates a switch unit;
    NUM_ROW_SW is the number of rows of all switch units;
    COMP_COUNT_ALL is the sum of all configurable units.
```

To generate a linear memory address for a particular unload chunk of a PCU, PMU, or AGCU unit, similar code can be used. One difference is that the number of rows of all switch units is different than the number of rows of all PCUs, the number of rows of all PMUs, and the number of rows of all AGCUs. Another difference is that the linear memory addresses for the switch units can start at a base address (e.g. 0), while the linear memory addresses for the PCUs, the PMUs and the AGCUs start at an address after the last chunk for the switch units, the PCUs, and the PMUs, respectively.

Figure 14:
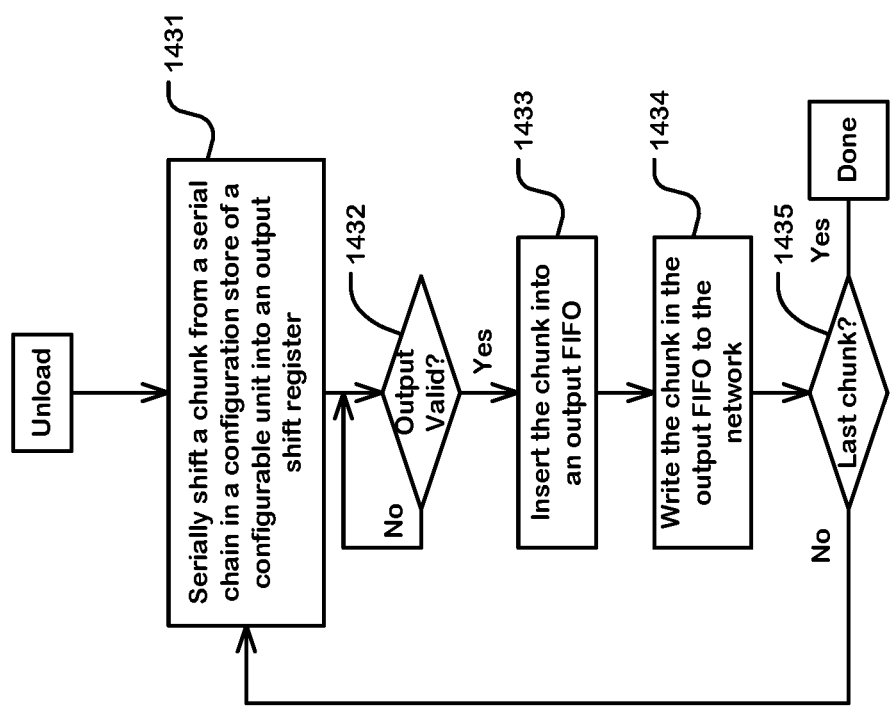
FIG. 14 is a flowchart illustrating a unit configuration unload process in a configurable unit.

FIG. 14 is a flowchart illustrating a unit configuration unload process in a configurable unit. At Step 1431, a chunk of configuration data from the configuration serial chain in the configuration data store is serially shifted into an output shift register (650, FIG. 6). The flow enters Step 1432.

At Step 1432, the unit configuration unload process waits for an output FIFO (660, FIG. 6) or other type of output buffer circuit, to become valid. At Step 1433, when the output FIFO becomes valid, the chunk of configuration data from the output shift register is inserted into the output FIFO. At Step 1434, the chunk of configuration data in the output FIFO is written to the bus system (FIG. 3).

At Step 1435, the unit configuration unload process determines whether the first chunk of configuration data is the last chunk of configuration data in the configuration data store. If so, unloading of configuration data for the configurable unit is complete. If not, the flow transitions back to Step 1431, and a second chunk of configuration data from the configuration data store is serially shifted into the output shift register.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A reconfigurable data processor, comprising:
   a bus system;
   an array of configurable units connected to the bus system, configurable units in the array including configuration data stores to store unit files comprising a plurality of sub-files of configuration data particular to corresponding configurable units; and
   a configuration unload controller connected to the bus system, including logic to execute an array configuration unload process, including distributing a command to a plurality of the configurable units in the array to unload the unit files particular to the corresponding configurable units, the unit files each comprising a plurality of ordered sub-files, receiving sub-files via the bus system from the array of configurable units, and assembling an unload configuration file by arranging the received sub-files in memory according to the configurable unit of the unit file of which the sub-file is a part, and the order of the sub-file in the unit file.

2. The processor of claim 1, wherein configurable units in the plurality of configurable units each include logic to execute a unit configuration unload process, including unloading the sub-files from the configuration store of the configurable unit and transmitting via the bus system, sub-files of a unit file particular to the configurable unit to the configuration unload controller.

3. The processor of claim 2, wherein the configuration data store in a configurable
unit in the plurality of configurable units comprises a serial chain and an output buffer coupled to the serial chain, and the unit configuration unload process shifts the sub-files of the unit file out of the serial chain to the output buffer, and transmits the sub-file from the output buffer on the bus system.

4. The processor of claim 1, wherein the array configuration unload process includes
receiving from a host process, configuration unload command identifying an address location in memory at which to store an unload configuration file, and said assembling includes calculating address offsets from the address location for the sub-files.

5. The processor of claim 1, wherein the configuration file includes a plurality of sub-files of unit files for each configurable unit in a plurality of configurable units, the unit files having up to M sub-files having an order (i) in the unit file, and being arranged in the unload configuration file so that all sub-files of order (i) for all the unit files in the unload configuration file are stored in a corresponding block (i) of address space in the memory, for (i) going from O to M-1.

6. The processor of claim 5, wherein the array includes more than one type of configurable unit, and the unit files for different types of configurable units include different numbers of sub-files of configuration data, and wherein within a block (i) of address space, the sub-files for each type of configurable unit are stored in a group of contiguous addresses within the block (i).

7. The processor of claim 1, wherein a sub-file has a number N of bits of data, and
the bus system is configured to transfer N bits of data in one bus cycle.

8. The processor of claim 1, wherein the unit files of the configurable units in the
array of configurable units have at most M sub-files, and said arranging the received subfiles in memory includes:
storing the unload configuration file in memory in a plurality of blocks (i) of addresses, for (i) going from Oto up to M-1, and storing sub-file (i), of the unit files for all of the configurable units in the plurality of configurable units in block (i); and
transmitting said sub-files includes sending packets on the bus system having a header and a payload, the payload including the sub-files, and the header identifying the configurable unit from with the sub-file is being sent and the order of the sub-file.

9. The processor of claim 1, wherein the bus system includes a top level network
including an external data interface and an array interface, and an array level network connected to the array interface and to the configurable units in the array of configurable units.

10. The processor of claim 9, wherein the array configuration unload process routes
sub-files of the unload configuration file to memory via the top level network using addresses implied by order of the sub-files in the unit files of the configurable units.

11. The processor of claim 9, wherein the unit configuration unload process routes
sub-files of the unload configuration file to memory via the top level network using addresses implied by order of the sub-files in the unit files of the configurable units.

12. The processor of claim 1, wherein configurable units in the plurality of configurable units use routes in the bus system during execution before unloading the configuration file also used in the configuration unload process.

13. The processor of claim 1, wherein the unit files comprise a plurality of ordered
sub-files, and the unload configuration file for an array of configurable units is assembled so that sub-files of the same order for all the configurable units of the same type are stored in a block of address space, and so that location of a sub-file in the unload configuration file corresponds with the configurable unit in the array of the sub-file and its order in the unit file particular to the configurable unit.

14. A method for operating a reconfigurable data processor comprising a bus system
and an array of configurable units connected to the bus system, configurable units in the array including configuration data stores to store unit files comprising a plurality of subfiles
of configuration data particular to the corresponding configurable units, the method comprising:
distributing a command to a plurality of the configurable units in the array to unload the unit files particular to the corresponding configurable units, the unit files each comprising a plurality of ordered sub-files.

15. The method of claim 14, including receiving sub-files from the array of
configurable units from the bus system and assembling an unload configuration file by arranging the received sub-files in memory according to the configurable unit of the unit file of which the sub-file is a part, and the order of the sub-file in the unit file.

16. The method of claim 15, wherein the configuration file includes a plurality of subfiles
of unit files for each configurable unit in a plurality of configurable units, the unit files having up to M sub-files having an order (i) in the unit file, and being arranged in the unload configuration file so that all sub-files of order (i) for all the unit files in the unload configuration file are stored in a corresponding block (i) of address space in the memory, for (i) going from O to M-1.

17. The method of claim 16, wherein the array includes more than one type of configurable unit, and the unit files for different types of configurable units include different numbers of sub-files of configuration data, and wherein within a block (i) of address space, the sub-files for each type of configurable unit are stored in a group of contiguous addresses within the block (i) of address space.

18. The method of claim 14, including unloading the sub-files from the configuration
store of the configurable unit and transmitting via the bus system, sub-files of a unit file particular to the configurable unit to the configuration unload controller.

19. The method of claim 14, wherein the configuration data store in a configurable
unit in the plurality of configurable units comprises a serial chain and an output buffer coupled to the serial chain, and said unloading includes shifting the sub-files of the unit file out of the serial chain to the output buffer, and transmitting the sub-file from the output buffer on the bus system.

20. The method of claim 14, including receiving from a host process, configuration
unload command identifying an address location in memory at which to store an unload configuration file, and said assembling includes calculating address offsets from the address location for the sub-files.

21. The method of claim 14, wherein a sub-file has a number N of bits of data, and
the bus system is configured to transfer N bits of data in one bus cycle.

22. The method of claim 14, wherein the unit files of the configurable units in the
array of configurable units have at most M sub-files, and said arranging the received subfiles
in memory includes:
storing the unload configuration file in memory in a plurality of blocks (i) of address space, for (i) going from O to up to M-1, and storing sub-file (i) of the unit files for all of the configurable units in the plurality of configurable units in block (i) of address space; and
transmitting sub-files from the configurable units in the array by sending packets on the bus system having a header and a payload, the payload including a sub-file, and the header identifying the configurable unit from with the sub-file in the payload is being sent and the order of the sub-file.

23. The method of claim 14, wherein the bus system includes a top level network
including an external data interface and an array interface, and an array level network connected to the array interface and to the configurable units in the array of configurable units.

24. The method of claim 23, wherein the array configuration unload process routes
sub-files of the unload configuration file to memory via the top level network using addresses implied by order of the sub-files in the unit files of the configurable units.

25. The method of claim 23, wherein the unit configuration unload process routes
sub-files of the unload configuration file to memory via the top level network using addresses implied by order of the sub-files in the unit files of the configurable units.

26. The method of claim 14, including using routes in the bus system during execution before unloading the configuration file also used to receive the sub-files.

27. The method of claim 14, wherein the unit files comprise a plurality of ordered
sub-files, and the unload configuration file for an array of configurable units is assembled so that sub-files of the same order for all the configurable units of the same type are stored in a linear address space, and so that location of a sub-file in the unload configuration file corresponds with the configurable unit in the array of the sub-file and its order in the unit file particular to the configurable unit.

\* \* \* \* \*